(12) United States Patent
Hansen

(10) Patent No.: US 11,805,732 B2
(45) Date of Patent: Nov. 7, 2023

(54) HARVESTING MACHINE CONTROL SYSTEM WITH HAULAGE VEHICLE ROUTE BASED ON PRE-DEFINED MACHINE PATH

(71) Applicant: Deere & Company, Moline, IL (US)

(72) Inventor: Matthew D. Hansen, Bondurant, IA (US)

(73) Assignee: Deere & Company, Moline, IL (US)

( * ) Notice: Subject to any disclaimer, the term of this patent is extended or adjusted under 35 U.S.C. 154(b) by 102 days.

(21) Appl. No.: 17/503,923

(22) Filed: Oct. 18, 2021

(65) Prior Publication Data

US 2023/0124026 A1    Apr. 20, 2023

(51) Int. Cl.
| | |
|---|---|
| *A01D 41/127* | (2006.01) |
| *G05D 1/02* | (2020.01) |
| *G05D 1/00* | (2006.01) |
| *A01D 90/10* | (2006.01) |

(52) U.S. Cl.
CPC ....... *A01D 41/1278* (2013.01); *G05D 1/0212* (2013.01); *A01D 90/10* (2013.01); *G05D 1/0088* (2013.01); *G05D 2201/0201* (2013.01)

(58) Field of Classification Search
CPC .. A01D 41/1278; A01D 90/10; G05D 1/0212; G05D 1/0088; G05D 2201/0201
USPC .......................................................... 701/25
See application file for complete search history.

(56) References Cited

U.S. PATENT DOCUMENTS

| | | | |
|---|---|---|---|
| 11,589,509 B2* | 2/2023 | Vandike | A01D 69/00 |
| 2009/0037041 A1* | 2/2009 | Senneff | A01B 69/008 |
| | | | 701/23 |
| 2019/0353483 A1* | 11/2019 | Liu | A01B 69/008 |
| 2020/0064144 A1* | 2/2020 | Tomita | A01D 69/00 |
| 2020/0128734 A1 | 4/2020 | Brammeier et al. | |
| 2020/0128737 A1 | 4/2020 | Anderson et al. | |
| 2021/0302962 A1* | 9/2021 | Sakaguchi | G05D 1/0088 |
| 2021/0339768 A1* | 11/2021 | Kakkar | G05D 1/0212 |
| 2021/0357664 A1* | 11/2021 | Kocer | G05D 1/0282 |
| 2022/0087092 A1* | 3/2022 | Nakabayashi | G05D 1/0223 |

FOREIGN PATENT DOCUMENTS

WO    WO2020038810 A1    2/2020

* cited by examiner

*Primary Examiner* — Yazan A Soofi
(74) *Attorney, Agent, or Firm* — Christopher J. Volkmann; Kelly, Holt & Christenson, PLLC

(57) ABSTRACT

An agricultural harvesting machine includes a harvested crop repository having a fill capacity, a crop processing system configured to engage crop in a field, perform a crop processing operation on the crop, and move the processed crop to the harvested crop repository, a fill level sensor configured to generate a fill level signal indicative of a current fill level of the harvested crop repository, and a control system configured to obtain a machine path definition that represents a machine path for the agricultural harvesting machine, wherein the machine path definition defines a turn pattern and a land size of a land in the field, identify a rendezvous point in the field for the agricultural harvesting machine and a haulage vehicle based on the machine path definition, and generate a control signal based on the rendezvous point.

19 Claims, 23 Drawing Sheets

HARVESTING MACHINE CONTROL SYSTEM WITH HAULAGE VEHICLE ROUTE BASED ON PRE-DEFINED MACHINE PATH

FIELD OF THE DESCRIPTION

The present description generally relates to agricultural harvesting machines. More specifically, but not by limitation, the present description relates to a harvesting machine control system configured to perform haulage vehicle route generation and control based on a machine path definition for the harvesting machine.

BACKGROUND

There are many different types of mobile machines. There are also many different types of mobile machines that have local material storage repositories that store material that is gathered, or that is distributed, by the machine.

For instance, in one example, an agricultural harvester harvests material, such as grain. In harvesting grain, the harvester processes the grain and stores the grain in a clean grain tank. When the clean grain tank is full, the combine harvester unloads the clean grain into a haulage vehicle or unit, which may be a grain cart pulled by a tractor. The haulage unit then often transports the harvested grain to another vehicle, such as a semi-truck for transport to a different location.

Other examples of mobile work machines that collect material include machines such as a sugarcane harvester, a forage harvester, a baler, a timber harvester, an asphalt milling machine, a scraper, among a wide variety of other machines.

With these types of machines, logistical efficiency can be desirable. For instance, if a combine harvester reaches its full capacity at some point in a field, and there is no haulage unit nearby, then the combine harvester sits idle, waiting to unload its clean grain tank, until a haulage unit arrives. This increases the inefficiency of the combine harvester, and of the overall harvesting operation.

Similarly, in a given harvesting operation, there may be multiple different combine harvesters operating in a single field, along with multiple different haulage units. If the haulage units go to the wrong harvester (e.g., if the haulage units go to a harvester that is not yet at its full capacity, while a different harvester is already at its full capacity), this can also raise the inefficiency of the operation. Further, it may be that the operators of the haulage units do not know when a particular combine harvester is reaching its capacity.

Machines that distribute material often also have a local repository that stores the material to be distributed. Such agricultural machines include sprayers or other vehicles that apply fertilizer or other chemicals to a field. In operation, the sprayer is often loaded with fertilizer or another chemical and distributes the chemical on a field. When the local storage repository (e.g., the tank) becomes empty, the sprayer or the other vehicle must have more fertilizer or chemical loaded into it.

The discussion above is merely provided for general background information and is not intended to be used as an aid in determining the scope of the claimed subject matter.

SUMMARY

An agricultural harvesting machine includes a harvested crop repository having a fill capacity, a crop processing system configured to engage crop in a field, perform a crop processing operation on the crop, and move the processed crop to the harvested crop repository, a fill level sensor configured to generate a fill level signal indicative of a current fill level of the harvested crop repository, and a control system configured to obtain a machine path definition that represents a machine path for the agricultural harvesting machine, wherein the machine path definition defines a turn pattern and a land size of a land in the field, identify a rendezvous point in the field for the agricultural harvesting machine and a haulage vehicle based on the machine path definition, and generate a control signal based on the rendezvous point.

Example 1 is an agricultural harvesting machine comprising:
  a harvested crop repository having a fill capacity;
  a crop processing system configured to engage crop in a field, perform a crop processing operation on the crop, and move the processed crop to the harvested crop repository;
  a fill level sensor configured to generate a fill level signal indicative of a current fill level of the harvested crop repository; and
  a control system configured to:
    obtain a machine path definition that represents a machine path for the agricultural harvesting machine, wherein the machine path definition defines a turn pattern and a land size of a land in the field;
    identify a rendezvous point in the field for the agricultural harvesting machine and a haulage vehicle based on the machine path definition; and
    generate a control signal based on the rendezvous point.

Example 2 is the agricultural harvesting machine of any or all previous examples, and further comprising a communication system, wherein the control system is configured to control the communication system to communicate an indication of the rendezvous point to the haulage vehicle.

Example 3 is the agricultural harvesting machine of any or all previous examples, wherein the control system is configured to:
  identify a location of the haulage vehicle;
  generate a route for the haulage vehicle to the rendezvous point based on the location of the haulage vehicle; and
  control the communication system to communicate an indication of the route to the haulage vehicle.

Example 4 is the agricultural harvesting machine of any or all previous examples, wherein the control system is configured to:
  identify harvested areas of the field based on the machine path definition; and
  generate the route for the haulage vehicle to the rendezvous point based on the identified harvested areas.

Example 5 is the agricultural harvesting machine of any or all previous examples, wherein the control system is configured to:
  identify one or more obstacles in the field; and
  identify the route for the haulage vehicle to the rendezvous point based on the one or more obstacles.

Example 6 is the agricultural harvesting machine of any or all previous examples, wherein
  the machine path definition comprises a turn direction, and
  the turn pattern comprises one of spiral-in or spiral-out.

Example 7 is the agricultural harvesting machine of any or all previous examples, wherein the land comprises a portion of the field on which the turn pattern is executed, and the land size represents a number of navigation paths on the land.

Example 8 is the agricultural harvesting machine of any or all previous examples, wherein the control system is configured to identify the rendezvous point based on the fill level signal.

Example 9 is the agricultural harvesting machine of any or all previous examples, wherein the control system is configured to:
- obtain a predicted crop yield along the machine path; and
- identify the rendezvous point based on the predicted crop yield.

Example 10 is the agricultural harvesting machine of any or all previous examples, wherein the control system is configured to:
- obtain a predicted crop yield at a plurality of different field segments along the machine path;
- generate a georeferenced probability distribution indicative of a probability that the harvested crop repository will reach the fill capacity in the different field segments along the machine path; and
- identify the rendezvous point based on the georeferenced probability distribution.

Example 11 is the agricultural harvesting machine of any or all previous examples, wherein the control system is configured to:
- send a mode transition control signal to the haulage vehicle to transition the haulage vehicle from a first mode, in which the haulage vehicle is in a following position that follows the agricultural harvesting machine, to a second mode in which the haulage vehicle is in an unloading position configured to receive harvested crop from the agricultural harvesting machine.

Example 12 is a method performed by an agricultural harvesting machine, the method comprising:
- obtaining a machine path definition that represents a machine path for the agricultural harvesting machine, wherein the machine path definition defines a turn pattern and a land size of a land in a field;
- controlling a crop processing system to engage crop in the field, perform a crop processing operation on the crop, and move the processed crop to a harvested crop repository having a fill capacity;
- identifying a rendezvous point in the field for the agricultural harvesting machine and a haulage vehicle based on the machine path definition; and
- generating a control signal based on the rendezvous point.

Example 13 is the method of any or all previous examples, wherein the control signal controls a communication system to communicate an indication of the rendezvous point to the haulage vehicle.

Example 14 is the method of any or all previous examples, and further comprising:
- identifying a location of the haulage vehicle;
- generating a route for the haulage vehicle to the rendezvous point based on the location of the haulage vehicle; and
- controlling the communication system to communicate an indication of the route to the haulage vehicle.

Example 15 is the method of any or all previous examples, wherein
- the machine path definition comprises a turn direction, and
- the turn pattern comprises one of spiral-in or spiral-out.

Example 16 is the method of any or all previous examples, and further comprising:
- obtaining a predicted crop yield at a plurality of different field segments along the machine path;
- generating a georeferenced probability distribution indicative of a probability that the harvested crop repository will reach the fill capacity in the different field segments along the machine path; and
- identifying the rendezvous point based on the georeferenced probability distribution.

Example 17 is the method of any or all previous examples, and further comprising:
- sending a mode transition control signal to the haulage vehicle to transition the haulage vehicle from a first mode, in which the haulage vehicle is in a following position that follows the agricultural harvesting machine, to a second mode in which the haulage vehicle is in an unloading position configured to receive harvested crop from the agricultural harvesting machine.

Example 18 is a control system for an agricultural harvesting machine, the control system comprising:
- at least one processor; and
- memory storing instructions executable by the at least one processor, wherein the instructions, when executed, cause the control system to:
  - obtain a machine path definition that represents a machine path for the agricultural harvesting machine, wherein the machine path definition defines a turn pattern and a land size of a land in a field;
  - control a crop processing system to engage crop in the field, perform a crop processing operation on the crop, and move the processed crop to a harvested crop repository having a fill capacity;
  - identify a rendezvous point in the field for the agricultural harvesting machine and a haulage vehicle based on the machine path definition; and
  - generate a control signal based on the rendezvous point.

Example 19 is the control system of any or all previous examples, wherein the instructions, when executed, cause the control system to communicate an indication of the rendezvous point to the haulage vehicle.

Example 20 is the control system of any or all previous examples, wherein the instructions, when executed, cause the control system to:
- obtain a predicted crop yield at a plurality of different field segments along the machine path;
- generate a georeferenced probability distribution indicative of a probability that the harvested crop repository will reach the fill capacity in the different field segments along the machine path; and
- identify the rendezvous point based on the georeferenced probability distribution.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 4-1, 4-2, and 4-3 (collectively referred to herein as FIG. 4) show a flow chart illustrating one example of operation of an agricultural harvesting machine.

DETAILED DESCRIPTION

With current combine harvesters, it can be difficult to tell when the clean grain tank is full. It can be even more difficult to predict, where, in the field that is being harvested, the clean grain tank will be full so that a haulage unit can rendezvous with the harvesting machine, at that point, or just prior to that point. Thus, it can be difficult to deploy harvesting machines and haulage units in an efficient manner.

The present description proceeds with respect to a system that receives, generates, or otherwise obtains a machine path definition that represents a machine path for an agricultural harvesting machine over a field. A machine path definition defines a turn pattern and a land size of a land in the field. Based on the machine path definition, the system identifies a rendezvous point and/or route for a haulage vehicle to rendezvous with, or meet, the agricultural harvesting machine in the field. In one example, the rendezvous point is based on a location where the agricultural harvesting machine is likely to become full and require unloading, either stationary or "on-the-go". In another example, the rendezvous point can be based on the current locations of the haulage vehicle and agricultural harvesting machine so that the haulage vehicle takes a route to the harvesting machine that is the closest or shortest path to intersect with the agricultural harvester path. The haulage vehicle can enter a follow mode in which the haulage vehicle follows the harvesting machine, until it is placed in a second or unload mode in which the haulage vehicle is positioned to receive the harvested crop from the harvesting machine. Since the determination of the rendezvous point is based on the machine path, in some examples the rendezvous point is along a subsequent pass in the field. That is, the rendezvous point is not along the current heading of the machine.

Similar types of operations can be performed with work other machines that collect material, such as other harvesters, asphalt milling machines, scrapers, etc. Similar types of operations can also be performed with respect to machines that distribute material, such as fertilizer or chemical application equipment. In those machines, it can be difficult to know where on a worksite a tank on the machine will be empty and need to be refilled. It can also be difficult to know where to rendezvous with a haulage unit used to refill the tank.

These are just examples how of the present description can be applied, and additional examples are provided below, all of which are contemplated herein.

Figure 1:
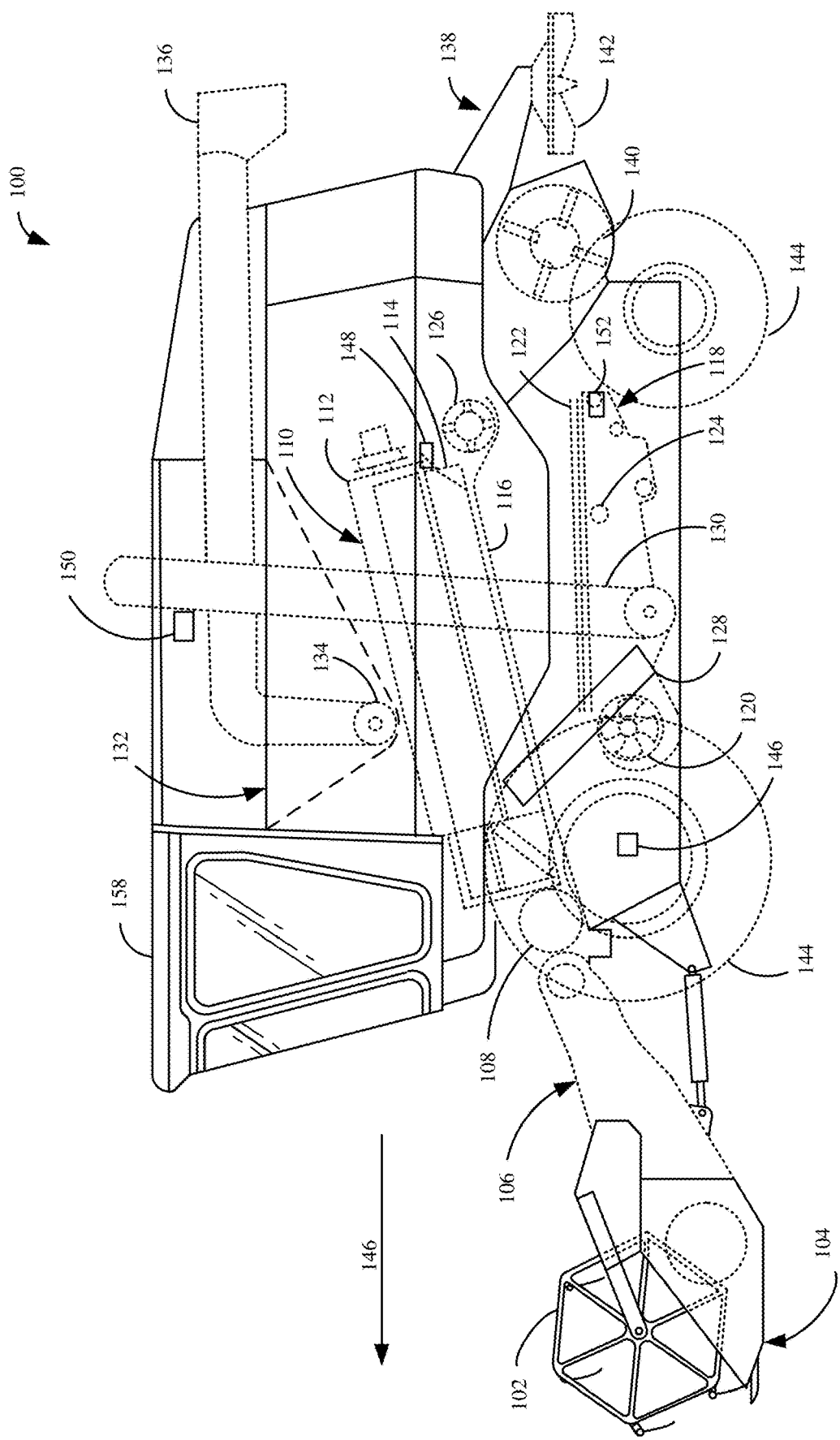
FIG. 1 is a partial pictorial, partial schematic view of one example of an agricultural harvesting machine.

FIG. 1 is a partial pictorial, partial schematic, illustration of an agricultural machine 100, in an example where machine 100 is a combine harvester (also referred to as harvester or combine 100). It can be seen in FIG. 1 that machine 100 illustratively includes an operator compartment 101, which can have a variety of different operator interface mechanisms, for controlling machine 100. Machine 100 can include a set of front end equipment that can include header 102, and a cutter generally indicated at 104. Machine 100 can also include a feeder house 106, a feed accelerator 108, and a thresher generally indicated at 110. Thresher 110 illustratively includes a threshing rotor 112 and a set of concaves 114. Further, machine 100 can include a separator 116 that includes a separator rotor. Machine 100 can include a cleaning subsystem (or cleaning shoe) 118 that, itself, can include a cleaning fan 120, chaffer 122 and sieve 124. The material handling subsystem in machine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Machine 100 can further include a residue subsystem 138 that can include chopper 140 and spreader 142. Machine 100 can also have a propulsion subsystem that includes an engine that drives ground engaging wheels 144 or tracks, etc. It will be noted that machine 100 may also have more than one of any of the subsystems mentioned above (such as left and right cleaning shoes, separators, etc.).

In operation, and by way of overview, machine 100 illustratively moves through a field in the direction indicated by arrow 146. As machine 100 moves, header 102 engages the crop to be harvested and gathers the crop toward cutter 104. After the crop is cut, the crop is moved through a conveyor in feeder house 106 toward feed accelerator 108, which accelerates the crop into thresher 110. The crop is threshed by rotor 112 rotating the crop against concaves 114. The threshed crop is moved by a separator rotor in separator 116 where some of the residue is moved by discharge beater 126 toward the residue subsystem 138. The residue can be chopped by residue chopper 140 and spread on the field by spreader 142. In other configurations, the residue is simply chopped and dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits the clean grain in clean grain tank 132. Residue can be removed from the cleaning shoe 118 by airflow generated by cleaning fan 120. Cleaning fan 120 directs air along an airflow path upwardly through the sieves and chaffers and the airflow carries residue can also be rearwardly in machine 100 toward the residue subsystem 138.

Tailings can be moved by tailings elevator 128 back to thresher 110 where the tailings can be re-threshed. Alternatively, the tailings can also be passed to a separate re-threshing mechanism (also using a tailings elevator or another transport mechanism) where the tailings can be re-threshed as well.

FIG. 1 also shows that, in one example, machine 100 can include ground speed sensor 147, one or more separator loss sensors 148, a clean grain camera 150, and one or more cleaning shoe loss sensors 152. Ground speed sensor 147 illustratively senses the travel speed of machine 100 over the ground. Travel speed sensing can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will also be appreciated that sensor and measurement mechanisms (in addition to the sensors already described) can include other sensors on machine 100 as well. For instance, sensors can include a residue setting sensor that is configured to sense whether machine 100 is configured to chop the residue, drop a windrow, etc. The sensors can include cleaning shoe fan speed sensors that can be configured proximate fan 120 to sense the speed of the fan. The sensors can include a threshing clearance sensor that senses clearance between the rotor 112 and concaves 114. The sensors can include a threshing rotor speed sensor that senses a rotor speed of rotor 112. The sensors can include a chaffer clearance sensor that senses the size of openings in chaffer 122. The sensors can include a sieve clearance sensor that senses the size of openings in sieve 124. The sensors can include a material other than grain (MOG) moisture sensor that can be configured to sense the moisture level of the material other than grain that is passing through machine 100. The sensors can include machine setting sensors that are configured to sense the various configurable settings on machine 100. The sensors can also include a machine orientation sensor that can be any of a wide variety of different types of sensors that sense the orientation of machine 100. Crop property sensors can sense a variety of different types of crop properties, such as crop type, crop moisture, and other crop properties. The sensors can also be configured to sense characteristics of the crop as the crop is being processed by machine 100. For instance, the sensors can sense grain feed rate, as the grain travels through clean grain elevator 130. The sensors can sense mass flow rate of grain through elevator 130, or provide other output signals indicative of other sensed variables. Some additional examples of the types of sensors that can be used are described below.

Figure 2:
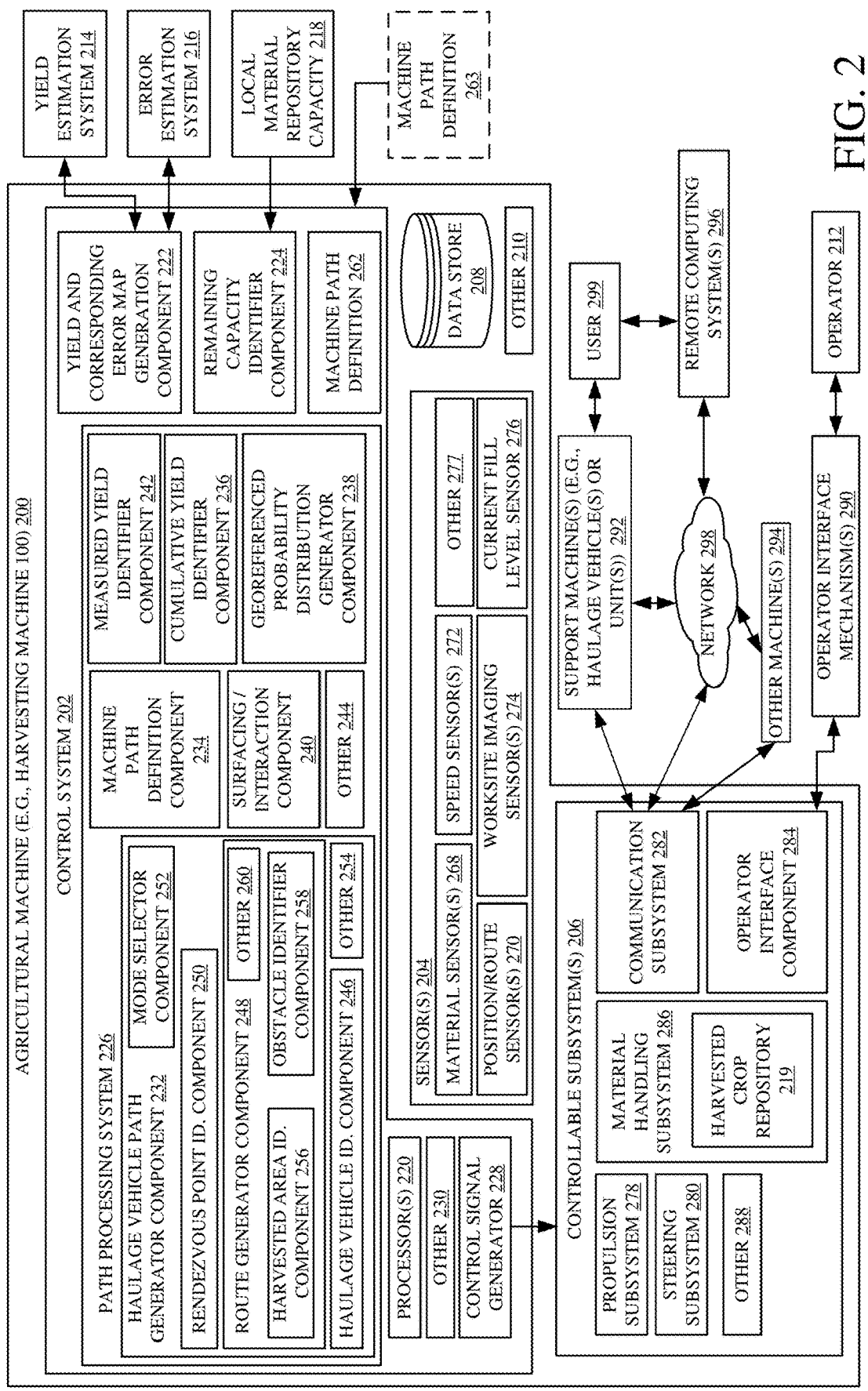
FIG. 2 is a block diagram showing one example an agricultural harvesting machine.

FIG. 2 is a block diagram showing one example of an agricultural machine 200. Some examples of agricultural machine 200 include, but are not limited to, a tilling machine, a planting machine, a product application (e.g., spraying) machine, a harvesting machine (also referred to as a "harvester" or "combine"), and a windrower, to name a few. For instance, machine 200 can include combine 100 illustrated in FIG. 1. For sake of discussion, but not by limitation, some examples will be described below in the context of a harvesting operation, and machine 200 will also be referred to as harvesting machine 200.

Machine 200 includes a control system 202, one or more sensors 204, and one or more controllable subsystems 206. Machine 200 can also include a data store 208, and can include one or more other items 210. In an example, control system 202 can be configured to operate machine 200 in autonomous or semi-autonomous modes, e.g., in which an operator 212 is on-board or nearby to perform one or more functions. These functions may include, for example without limitation, one or more of guidance, safeguarding, diagnosis, task monitoring, task control, or data recording.

Control system 202 can receive input from a yield estimation system 214 and an error estimation system 216. Control system 202 can also receive a capacity indicator 218 indicating the capacity of a local harvested crop repository 219 (e.g., clean grain tank 132) on machine 200. It will be appreciated that systems 214 and 216, and capacity indicator 218, can all be on machine 200. They are shown separately for the sake of example only.

In the example of FIG. 2, control system 202 includes one or more processor(s) 220, a yield and corresponding error map generation component 222, a remaining capacity identifier component 224, a path processing system 226, and a control signal generator 228. Control system 202 can include other items 230 as well.

Path processing system 226 illustratively includes a haulage vehicle path generator component 232, a machine path definition component 234, a cumulative yield identifier component 236, a georeferenced probability distribution generator component 238, a surfacing/interaction component 240, and a measured yield identifier component 242. System 226 can include other items 244 as well.

Haulage vehicle path generator component 232 includes a haulage vehicle identification component 246, a route generator component 248, a rendezvous point identifier component 250, and a haulage vehicle mode selector component 252. Component 232 can include other items 254 as well. Haulage vehicle identification component 246 is configured to identify one or more haulage vehicles or units on or in the vicinity to the current field being operated upon by machine 200. Component 246 can also determine the current location of the haulage vehicle(s), for example based on location data received from the haulage vehicle(s). Route generator component 248 includes a harvested area identifier component 256 and an obstacle identifier component 258. Component 248 can include other items 260 as well.

Sensors 204 include material sensors 268, position/route sensors 270, speed sensors 272, worksite imaging sensors 274, a current fill level sensor 276, and can include other sensors 277 as well.

Material sensors 268 are configured to sense material being moved, processed, or otherwise worked on by machine 200. For example, material sensors 268 include yield sensors. Position/route sensors 270 are configured to identify a position of machine 200 and/or a corresponding route (e.g., heading) of machine 200 as machine 200 traverses the field. A position sensor can be any of a wide variety of different types of position sensors such as a global positioning system (GPS) receiver, a dead reckoning system, or a wide variety of other systems that provide an indication of a current geographic location of harvesting machine 200. The systems can provide orientation, ground speed and other information as well. Speed sensors 272 are configured to output a signal indicative of a speed of machine 200. Worksite imaging sensors 274 are configured to obtain images of the field, which can be processed, for example to identify conditions of the field. Examples of conditions include, but are not limited to, terrain topology, terrain roughness, terrain soil conditions, obstacles that inhibit operation of machine 200, etc. In an example agricultural harvester, signals from worksite imaging sensors 274 can be used to identify crop characteristics, such as an expected yield, whether the crop being harvested is "downed", etc.

Current fill level sensor 276 illustratively senses a fill level in the local material repository (e.g., the clean grain tank) on harvesting machine 200. Sensor 276 can be any of a wide variety of different level sensors, such as an optical sensor, a weight or mass sensor, a mass flow sensor that measures the amount of material entering clean grain tank 132 since tank 132 was last emptied, etc.

Controllable subsystems 206 can include a propulsion subsystem 278, a steering subsystem 280, a communication subsystem 282, an operator interface component 284, and a material handling subsystem 286. Examples of subsystem 286 includes a threshing subsystem, a cleaning subsystem, and a residue subsystem, such as those discussed above with respect to FIG. 1. The harvested crop is stored in harvested crop repository 219. Subsystems 206 can include other items 288 as well.

Control signal generator 228 can generate control signals to control operator interface component 284. The operator interface component 284 can control operator interface mechanisms 290, and receive operator interactions through mechanisms 290. Operator interface mechanisms 290 may include such things as a steering wheel, joystick, levers, pedals, linkages, buttons, switches, and other such mechanisms. Mechanisms 290 can also include such things as a touch sensitive display screen so that user input mechanisms can be displayed, and actuated by operator 212, using touch gestures. Mechanisms 290 can include a microphone and corresponding speech recognition system, as well as a speaker and corresponding speech synthesis system. Operator interface mechanisms 290 can include a wide variety of other mechanical, electromechanical, visual, audio or haptic systems as well. These, of course, are for sake of example only.

Control signal generator 228 can also control communication subsystem 282 to communicate with other systems or machines. For example, communication subsystem 282 can communicate with one or more support vehicles (e.g., haulage vehicles or units) 292, other machines 294, and remote computing system(s) 296, either directly or over a network 298. Network 298 can be any of a wide variety of different types of networks. For instance, network 298 can be a wide area network, a local area network, a near field communication network, a cellular communication network, or any of a wide variety of other networks, or combinations of networks. Machines 294 can include other machines operating in the field along with machine 200. Machines 294 can be of a same type, or different type, as machine 200. For instance, where machine 200 is an agricultural harvesting machine, machine 294 can include a second harvesting machine working in tandem with machine 200. In another example, where machine 200 is a windrower, machine 294 can include a second windrower working in tandem with machine 200.

Communication subsystem 282 can include wired and/or wireless communication components, which can be substantially any communication system that can be used by the systems and components of machine 200 to communicate information to other items, such as between control system 202, sensors 204, and controllable subsystems 206. In one example, communication subsystem 282 communicates over a controller area network (CAN) bus (or another network, such as an Ethernet network, etc.) to communicate information between those items. This information can include the various sensor signals and output signals generated by the sensor variables and/or sensed variables.

A remote user 299 is illustrated as interacting with remote computing system 296, such as to receive communications from or send communications to machine 200 through communication subsystem 282. For example, but not by limitation, remote user 299 can receive communications, such as notifications, requests for assistance, etc., machine 200 on a mobile device.

Before describing the operation of harvesting machine 200 in more detail, a brief description of some of the items illustrated in FIG. 2, and their operation, will first be provided.

Yield estimation system 214 illustratively generates an estimate of yield at different geographic locations in the field being harvested by machine 200. The yield estimation system 214 can take a wide variety of different forms and illustratively provides a georeferenced prior estimate of yield. Briefly, by prior, it is meant that the data is formed or obtained beforehand, prior to the operation by machine 200.

The estimating techniques can include a wide variety of different techniques such as in-season remote sensing, sampling ears from individual plants and extrapolating results across the field, and crop modeling. Yield estimation system 214 may include near real time sensing which may include, for instance, on-board image capture devices (which capture images ahead of machine 200, or to the sides of machine 200) and corresponding image processing logic that processes the images to identify an estimated yield. The on-board system may include other types of perception systems as well, such as LIDAR, stereo cameras, etc. In another example, yield estimation system 214 can include a system that receives aerial images that are processed to generate normalized different vegetative index (NDVI) or leaf area index (LAI) at a particular growth stage, and uses one or more of those indices to estimate harvested yield. Yield estimation system 214 can also include real time yield sensors, which sense the current yield (such as the mass flow rate of grain through machine 200, or other sensors indicative of yield) and correct the forward-looking yield estimates in the field, and particularly in the path over which machine 200 is traveling. These and other types of yield estimation systems are contemplated herein.

Error estimation system 216 illustratively estimates an error corresponding to the yield estimate generated by system 214. In some examples, the error may be assumed to be 0%. In other examples, the error may be georeferenced and based on factors such as sensor signals, model outputs, or other sources of information used to predict or estimate the yield. The error may also be based on factors such as the time since a last ground-truthed data collection was performed, historical differences between predicted and measured yield for this location, environmental conditions or other factors which may result in a difference between the estimated yield provided by system 214 and the actual measured yield at a particular location.

Where statistical techniques are used by yield estimation system 214 in order to generate an estimated yield value, then estimated error distributions may be determined along with the expected yield values. Where perception systems are used by yield estimation system 214, then error may be estimated based on historic differences between the estimated and measured yields. The history may be from prior harvest at this location or other locations, from the current harvesting operation or a combination of the two data sets. Environmental factors, such as obscurants (e.g., dust, rain, snow, etc.), lighting and crop stand attributes may also be used by error estimation system 216 in order to generate a georeferenced estimate of error corresponding to the yield estimate output by yield estimation system 214.

Capacity indicator 218 may be a value that is stored on harvesting machine 200, itself. The value is illustratively indicative of the overall capacity of the clean grain tank on machine 200. Capacity indicator 218 can also be a value that is stored at a remote location, and accessed by communication subsystem 282 when harvesting machine 200 starts, or is about to start, its operation.

Yield and corresponding error map generation component 222 illustratively generates a georeferenced yield estimate, along with a georeferenced error estimate. The georeferenced yield estimate is illustratively a georeferenced predicted yield map for at least a portion of the field over which machine 200 is traveling, along with an error estimate corresponding to the georeferenced predicted yield. In one example, the georeferenced yield and corresponding error map is generated with a resolution that corresponds to segments along a travel path of harvesting machine 200. For instance, where harvesting machine 200 harvests twelve rows at a time, then the georeferenced yield and corresponding error map will illustratively output estimated yield and error values for geographic locations that are twelve rows wide and a certain row length (e.g., ten meters in linear row length). Of course, these values are examples only and the width of the path of harvesting machine 200, and the length of the segments for which a yield and corresponding error is estimated can vary widely. In one example, the values can be controlled or varied based on user inputs or otherwise. The yield and corresponding error map are output by component 222 to path processing system 226.

Remaining capacity identifier component 224 illustratively generates a value indicative of a remaining capacity in the local material repository (e.g., the clean grain tank 132) on harvesting machine 200. The remaining capacity value is illustratively updated as machine 200 continues to operate, performing the harvesting operation and filling its clean grain tank.

Machine path definition component 234 is configured to define or otherwise obtain a machine path definition 262. Machine path definition 262 can be obtained in any of a number of ways. For example, machine path definition 262 can be received by machine 200, as represented at block 263. Machine path definition 262 can be generated by another machine or system, such as system 296, and transmitted to machine 200. Alternatively, or in addition, machine path definition 262 can be generated by component 234 based on input from operator 212 through mechanisms 290.

Machine path definition 262 provides a pre-defined machine path for operation of machine 200 on the target field. Machine path definition 262 can be utilized by control system 202 to automatically navigate machine 200 along the pre-defined machine path. For instance, when harvesting corn, a combine harvester often has an unload auger that is only positionable over one side of the combine harvester. Therefore, in order to perform unloading while harvesting, the combine harvester must be controlled so that the unloading auger is always over an already-harvested portion of the machine (except, perhaps, during an initial pass opening up a field or a land). Such control can ensure that a grain cart can always operate next to the combine harvester without running over crop.

In one example, machine path definition 262 defines a navigation path for machine 200 through "lands", or sections of the field made up of some number of passes. The navigation path is pre-defined, in that the path of machine 200 is defined prior to the current operation.

Figure 3:
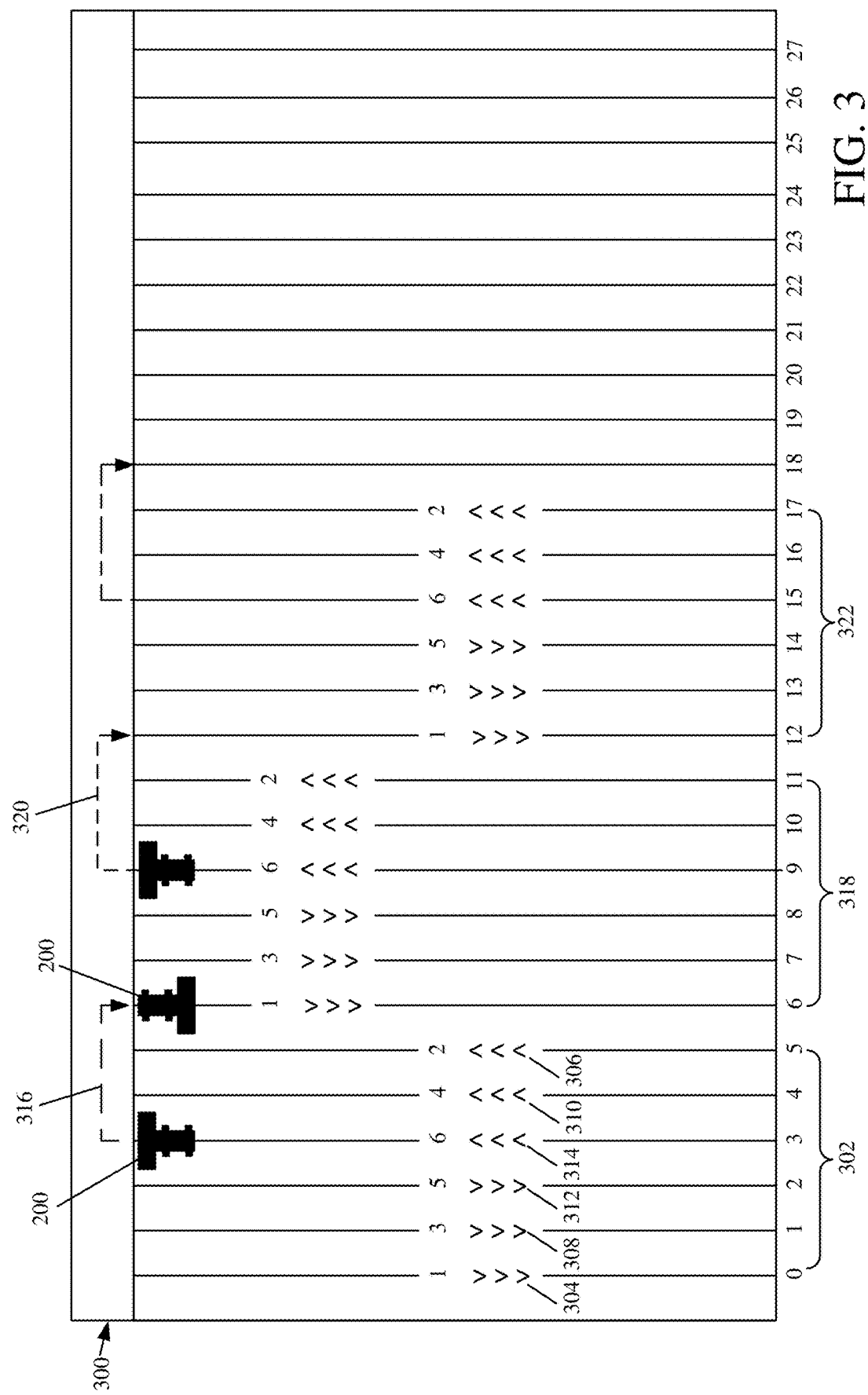
FIG. 3 illustrates one example of an agricultural harvesting machine harvesting lands in a field in accordance with a machine path definition.
Figures 1, 4:
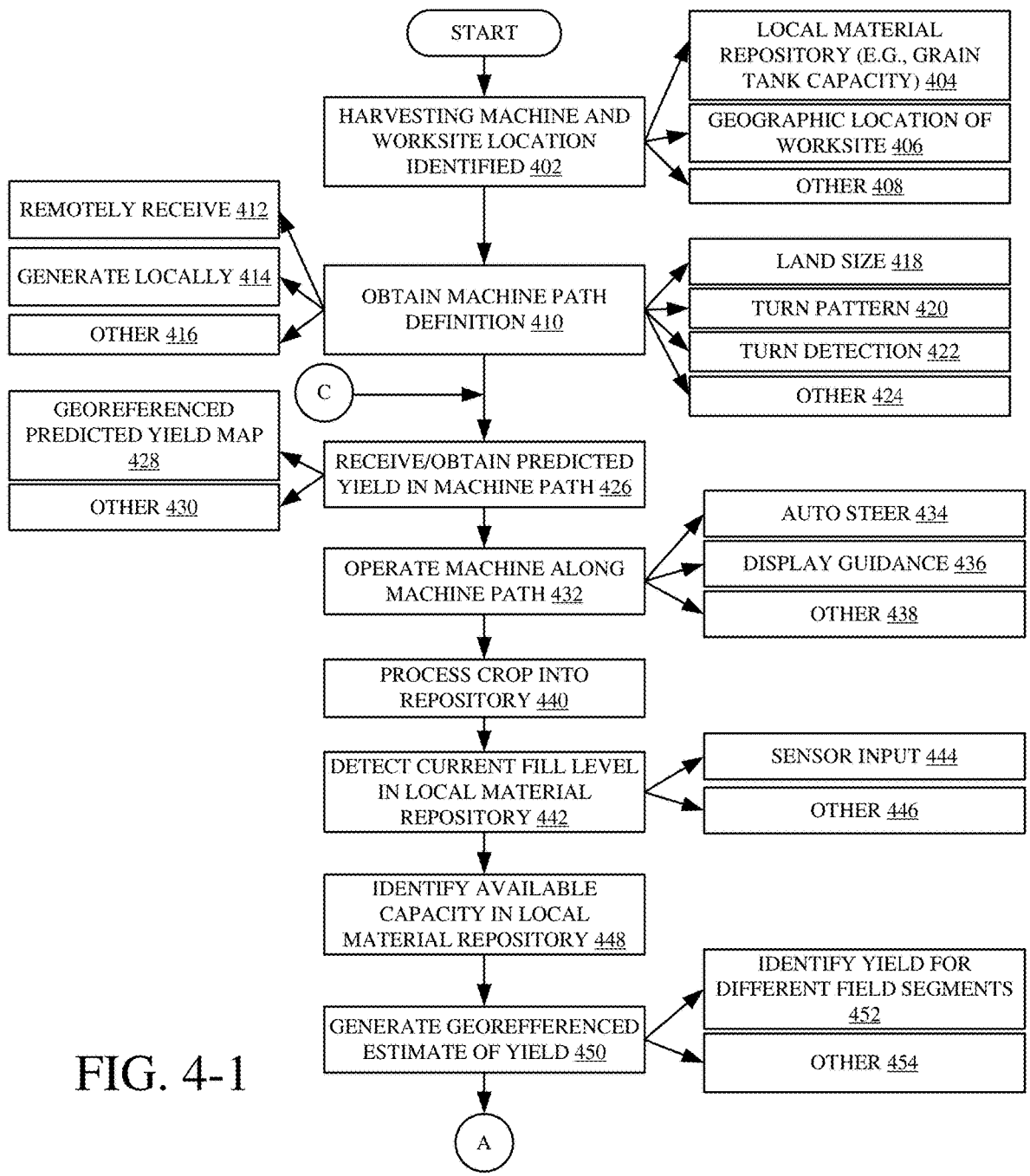
Figures 2, 4:
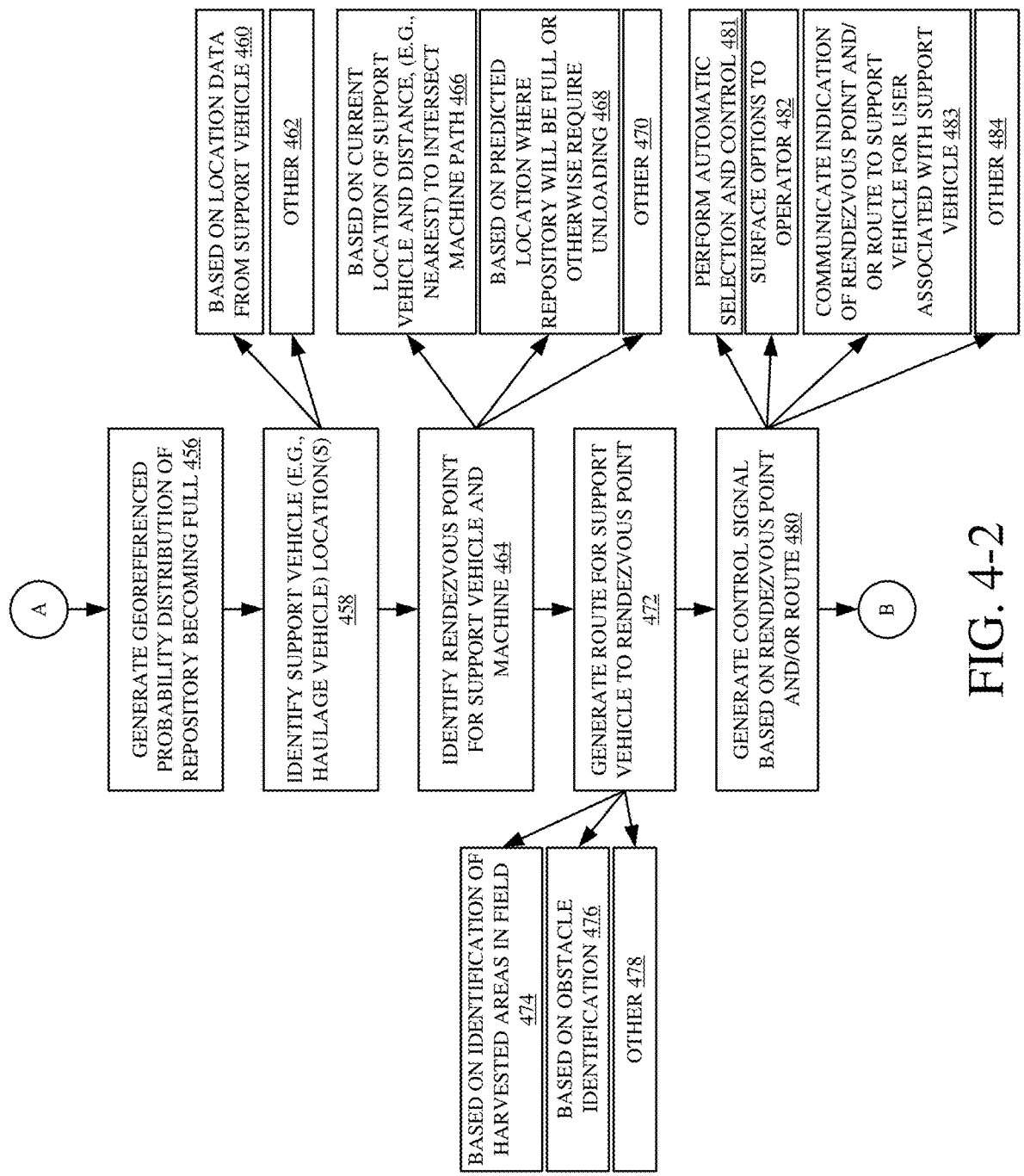
Figures 3, 4:
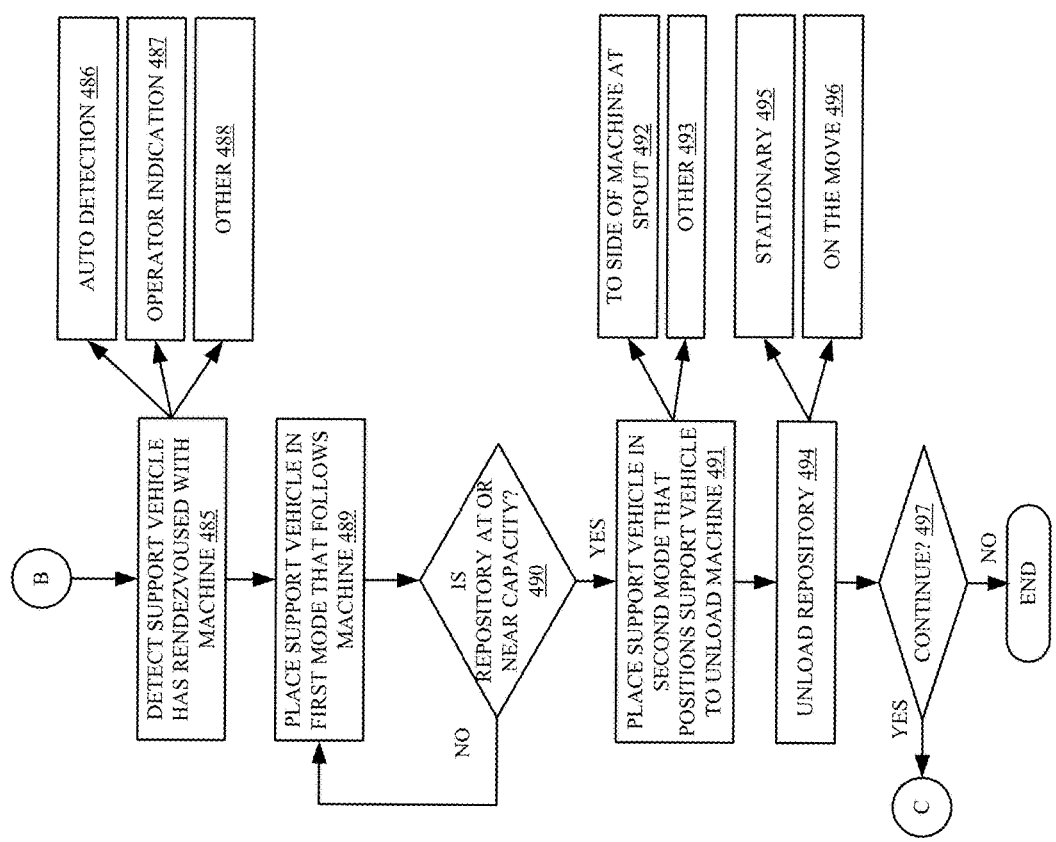

For sake of illustration, but not by limitation, FIG. 3 illustrates an example machine path definition for machine 200 on a field 300, that includes twenty-eight passes (labeled passes 0-27) to be completed by machine 200. Machine 200 is shown harvesting a first land 302, which includes passes 0-5, in a "spiral-in" pattern so that the first navigation pass through land 302 is along navigation path 0 in the direction indicated by arrows 304. The second pass through land 302 is along navigation path 5 in the direction indicated by arrows 306. The third pass through land 302 is along navigation path 1 in the direction indicated by arrows 308. The fourth pass through land 302 is along navigation path 4 in the direction indicated by arrow 310, fifth pass through land 302 is along navigation path 2 in the direction indicated by arrows 312, and the sixth pass through land 302 is along navigation path 3 in the direction indicated by arrows 314. Thus, in this example, the machine path definition includes a land size of six passes, a spiral-in turn pattern, and a left turn direction.

Alternatively, an example "spiral-out" pattern for machine 200 in land 302 includes a first pass along navigation path 2, a second pass along navigation path 3, a third pass along navigation path 1, a fourth pass along navigation path 4, a fifth pass along navigation path 0, and a sixth pass along navigation path 5.

After completing the six passes through land 302, machine 200 is navigated along a path 316 through already-harvested end rows to a different land 318 in field 300 beginning at path 6. Then, after completing land 318, machine 200 continues along path 320 to begin another land 322 along path 12.

Referring again to FIG. 2, machine path definition 262 includes a turn pattern (e.g., spiral-in or spiral-out) and/or a turn direction (e.g., left or right). Machine path definition 262 also includes a land size in the field (e.g., a number of passes to be made with the turn pattern before moving on to the next land or section in the field).

Control system 202 is configured to determine whether the current land that machine 200 is operating on will be completed after the present pass. If not, control system 202 then identifies the next pass through the field. To determine whether the land is completed, control system 202 can detect the number of paths that have been skipped in a spiral-in pattern to determine the number of paths that are left to harvest. Control system 202 can identify the number of paths skipped in a spiral-out pattern, and compare that to the land size, to determine whether the land size has been completed.

Once control system 202 detects that the land will be completed after the current pass, control system 202 identifies a next land that the machine 200 should proceed to, within the field. Control system 202 can detect when the field is completed so that a next land need not be harvested.

When conducting a spiral-out pattern, for instance, machine 200 does not skip any unharvested paths but instead proceeds to the next unharvested path and harvests the next unharvest path. When conducting a spiral-in pattern, the number of paths will include the land size (in terms of the number of paths) less one.

A rendezvous point for haulage vehicle 292 to rendezvous with and unload machine 200 is identified by component 250. The rendezvous point is determined based on machine path definition 262. Further, the rendezvous point can also be determined based on a current fill level indication from sensor 276 and/or a probability that harvested crop repository 219 will reach the fill capacity in different field segments along the predefined machine path. The probability can be determined based predicted crop yield along the machine path.

Route generator component 248 is configured to generate a route for haulage vehicle 292 to the identified rendezvous point. In one example, a haulage vehicle route is identified based on a current location of haulage vehicle 292 and the machine path definition. For example, the route can be generated based on an indication from component 256 of field areas that are already harvested (i.e., to prevent the haulage vehicle from running over and damaging unharvested crop) and/or an indication from component 258 of obstacles. Examples include, but are not limited to, obstacles related to terrain topology, terrain (e.g., soil) condition, and non-terrain obstacles. For instance, terrain topology-related obstacles include areas of terrain having a slope above a threshold, the edge or boundary of the field (e.g., a fence line, roadway, etc.), to name a few. Examples of terrain condition-related obstacles include indications of soil type or condition (e.g., saturated soil or areas of terrain that are under water), to name a few. Non-terrain obstacles can include obstructions such as poles or power lines on or along the field.

Mode selector component 252 is configured to select an operating mode for haulage vehicle 292. The operating mode can be communicated to and control haulage vehicle 292. For example, haulage vehicle 292 can operate in a first mode in which haulage vehicle 292 is in a following position that follows machine 200 and a second mode in which haulage vehicle 292 is in an unloading position (e.g., to the side of machine 200) in which haulage vehicle 292 is configured to receive harvested crop from the harvested crop repository via a spout of machine 200. A mode transition control signal can be sent to haulage vehicle 292 to transition from the first mode to the second mode.

Cumulative yield identifier component 236 identifies the cumulative yield that machine 200 will encounter, as machine 200 travels over the machine path. For instance, it may be that the path output by component 184 have corresponding estimated yields, in ten meter segments along the path. Therefore, as machine 200 travels along a given path, the yield that machine 200 has encountered will accumulate, with each harvested segment. Therefore, cumulative yield identifier component 236 identifies the cumulative yield that will be encountered by machine 200, as machine 200 travels along the machine path.

Georeferenced probability distribution generator component 238 then generates a georeferenced probability distribution indicative of the probability that the local material repository (e.g., the clean grain tank) will reach its capacity at different geographic locations along the machine path.

Measured yield identifier component 242 measures the actual yield encountered by machine 200. The measured yield value can be fed back to yield estimation system 214 or error estimation system 216 in order to correct the yield estimate or the error estimate. These corrected values can then be used by component 222 to generate an updated yield and corresponding error map.

Based on the various information generated by path processing system 226, control signal generator 228 generates control signals that are applied to controllable subsystems 206. For instance, control signal generator 228 can generate control signals to control propulsion subsystem 278 to control the speed of harvesting machine 200. By way of example, if harvesting machine 200 is going to be full relatively quickly, but it will take a haulage unit a longer amount of time to reach and unload machine 200, then control signal generator 228 can control propulsion subsystem 278 to slow down harvesting machine 200. Such control may reduce grain losses and may increase the likelihood that the haulage unit will be able to travel to harvesting machine 200 before harvesting machine 200 has reached the capacity of machine 200. In another example, if the georeferenced probability distribution indicates that, given the path harvesting machine 200 is taking, machine 200 will not be full before a haulage unit reaches machine 200, then control signal generator 228 may generate control signals to control propulsion subsystem 278 to increase the speed of harvesting machine 200 so that machine 200 can harvest more crop, and be closer to its capacity, when a haulage unit reaches it. These are examples only.

Control signal generator 228 can also generate control signals to control steering subsystem 280. For instance, control signal generator 228 can control steering subsystem 280 to steer harvesting machine 200 along the predefined machine path.

Control signal generator 228 is configured to control communication subsystem 282 to communicate various information within harvesting machine 200 to other machines or systems. In one example, communication subsystem 282 is configured to communicate an indication of a rendezvous point and/or route to haulage vehicle 292, remote computing system 296, or any other machine or system. In another example, communication subsystem 282 can communicate an indication of the rendezvous and/or route to a mobile device associated with a user of haulage vehicle 292. That user can utilize the information to navigate the haulage vehicle to the rendezvous point.

Control signal generator 228 can also generate control signals to control operator interface component 284, for example to render an indication of the rendezvous point and/or route.

FIGS. 4-1, 4-2, and 4-3 (collectively referred to as FIG. 4) provide a flow diagram illustrating one example of operation of an agricultural harvesting machine. For sake of illustration, but not by limitation, FIG. 4 will be described in the context of harvesting machine 200 discussed above with respect to FIG. 2.

At block 402, the harvesting machine 200 and the worksite location (e.g., the field to be harvested) are identified. In one example, the information identifying the particular harvesting machine 200 also includes capacity indicator 218, as represented at block 404. The information can also include the geographic location of the field to be harvested, as represented at block 406, and the information can include a wide variety of other information, as indicated by block 408. A machine path definition is obtained at block 410. As noted above, machine path definition 262 can be remotely received from another machine or system, as represented at block 412. For example, machine path definition 262 can be received from remote computing system 296. Alternatively, or in addition, as represented at block 414 machine path definition 262 can be generated by control system 202, for example based on operator inputs from operator 212 through operator interface mechanisms 290. In one example, operator 212 can provide inputs that map the machine path through the field to be harvested using any of a wide variety of different types of input mechanisms. Of course, the machine path definition can be obtained in other ways as well, as represented at block 416.

The machine path definition identifies a land size of a land in the field to be harvested, as represented at block 418. As discussed above with respect to FIG. 3, the land size 418 can indicate a number of passes in the field to be completed (e.g., six passes in the example of FIG. 3) before moving onto the next land (e.g., moving from land 302 to land 318). Also, the machine path definition can include a turn pattern (block 420), a turn direction (block 422), or other path attributes (block 424). The turn pattern and turn direction indicate how harvesting machine 200 will traverse the land, to complete that section of the field before moving onto the next land. For instance, the turn pattern can include a spiral-in, spiral-out, or any other pattern. The turn direction can indicate whether left turns, right turns, or some combination of left and right turns will be performed to achieve the turn pattern on the land size.

At block 426, map generation component 222 can receive or obtain a predicted yield corresponding to the machine path. In one example, component 222 outputs a georeferenced predicted yield map which identifies predicted yield at different geographical locations within the field, as represented at block 428. The yield map can be based on the yield estimate received from yield estimation system 214. Also, component 222 can output a georeferenced yield error estimate which identifies an estimate of error at the geographic locations with the field, for which the yield has been estimated. The georeferenced yield and corresponding error map can be output for the machine path of harvesting machine 200 through the field where machine 200 is harvesting. The yield estimates can be generated for segments of the field along the current pass of machine 200 and one or more subsequent passes corresponding to the land size, turn pattern, and turn direction defined in the machine path definition. Thus, the yield map identifies the predicted yield that will be encountered by machine 200 as machine 200 traverses the field along the machine path defined by machine path definition 262.

Of course, the predicted yield can be received and obtained in other ways as well, as represented by block 430.

Machine 200 is operated along the machine path as represented at block 432. For example, harvesting machine 200 can be automatically controlled, by control system 202 controlling steering subsystem 280 and/or propulsion subsystem 278, as represented by block 434. Alternatively, or in addition, control system 202 can control operator interface component 284 to render an indication of the machine path, to display or otherwise render guidance to operator 212, as represented at block 436. For example, operator interface component 284 can display or otherwise render a representation of a map with guidance lines that identify the machine path. Alternatively, or in addition, operator interface component 284 can output operator control inputs (e.g., suggested machine speed, turn inputs, etc.) to be provided by operator 212 to control harvesting machine 200 to traverse the field along the machine path. The machine can be operated in other ways as well, as represented at block 483.

As harvesting machine 200 traverses the field, at block 440 material handling subsystem 286 engages crop in the field, performs crop processing operations on the crop, and moves the processed crop to harvested crop repository 219.

At block 442, remaining capacity identifier component 224 receives a current fill level of repository 219. The current fill level can be based on a sensor input (block 444), or the current fill level can be obtained in other ways as well, as indicated by block 446. Remaining capacity identifier component 224 then identifies the available capacity (or remaining capacity) in repository 219 (in the grain tank), as represented at block 448. For instance, the current fill level (or measured amount) of material in the grain tank can be subtracted from the capacity of repository 219 to give the remaining capacity.

Path processing system 226 identifies the machine path through the field being harvested and correlates the path with the yield and corresponding error map generated by component 222. Cumulative yield identifier component 236, in one example, identifies the cumulative yield, for different sections along the path. Generating a georeferenced estimative yield is indicated by block 450. Identifying cumulative expected yield across different segments for the machine path is indicated by block 452. Of course, the georeferenced estimative yield can be generated in other ways as well, as represented at block 454.

Generator component 238 generates the georeferenced probability distribution of repository 219 becoming full. For instance, component 238 generates a probability distribution identifying different probabilities, at different geographic locations, where those probabilities are indicative of the probability that the grain tank on machine 200 will be full, at that particular geographic location, as represented at block 456.

At block 458, component 246 identifies one or more support vehicles (e.g., haulage vehicles 292) and their corresponding locations. For example, a location of the vehicles can be identified based on location data (e.g., GPS coordinates, etc.) received from the support vehicles, as represented at block 460. Of course, the support vehicles and their corresponding locations can be identified in other ways as well, as represented at block 462.

At block 464, a rendezvous point for a support vehicle and harvesting machine 200 is identified. In one example, the rendezvous point is identified based on the current location of a particular one of the support vehicles and the distance to a nearest intersection point with the machine path, as represented at block 466. For example, but not by limitation, rendezvous point identification component 250 can identify a travel speed for the support vehicle. Then, for each of a plurality of points along the machine path, component 250 can determine an estimated amount of time it will take for the support vehicle to traverse to corresponding point. Using the expected speed of machine 200 along the machine path, component 250 can identify the nearest point to the support vehicle that the support vehicle can reach prior to harvesting machine 200 reaching that point. In other words, component 250 identifies the nearest point that support vehicle 292 can reach along the machine path to rendezvous with harvesting machine 200.

In one example, as represented at block 468, component 250 can identify the rendezvous point based on a predicted location where repository 219 will become full or otherwise require loading into the support vehicle. For example, using the georeferenced probability distribution generated at block 456, component 250 can identify the point at which unloading of repository 219 will be required along the machine path. This rendezvous point can be in the current pass being made by harvesting machine 200, or another pass (adjacent or otherwise) in the field. Of course, the rendezvous point can be identified in other ways as well, as represented at block 470.

At block 472, route generator component 248 generates a route for the support vehicle to the rendezvous point identified at block 464. In one example, the route is generated based on identification of already harvested areas in the field, as represented at block 474. For example, route generator component 248 can utilize the machine path definition 262 to identify which areas of the field have already been harvested by machine 200. The generation of the route based on this information can be used so that the route for the support vehicle does not traverse over unharvested areas of the field, which can result in the damage to the unharvested crop.

Alternatively, or in addition, the route can be generated based on obstacle identification at block 476. As noted above, obstacle identifier component 258 can identify one or more obstacles in the field to be avoided by the support machine. Component 248 can generate the route to avoid these obstacles, while still ensuring that the support vehicle reaches the rendezvous point substantially at or prior to arrival of the harvesting machine 200 at the rendezvous point. Of course, the route can be generated in other ways as well, as represented at block 478.

At block 480, control signal generator 228 generates a control signal based on the rendezvous point identified at block 464 and/or the route generated at block 472. In one example, the control signal can perform automatic selection of a particular route option in control machine 200, as represented at block 481. In another example, control signal generator 228 can control operator interface component 284 to surface an indication of the rendezvous point and/or route on operator interface mechanisms 290 for interaction by operator 212. For example, input mechanisms can render an indication of the support vehicle, rendezvous point, and/or route for acceptance by operator 212. The user input mechanisms can provide options to operator 212 for approving or modifying the rendezvous point and route, as represented at block 482.

In one example, as represented at block 483, control signal generator 228 can generate control signal to control communication subsystem 282 to communicate the rendezvous point and/or route to the support vehicle (e.g., haulage vehicle 292), or any other machine or system. In one example, the control system can communicate an indication of the rendezvous point and route to a mobile device associated with a user of the support vehicle. Using this information, the user can manually navigate the support vehicle along the route to the rendezvous point.

Of course, the control signal can be generated in other ways as well, as represented at block 484.

At block 485, control system 202 detects that the support vehicle has rendezvoused with harvesting machine 200 at the rendezvous point. The rendezvous detection can include, in one example, automatic detection of the support vehicle, as represented at block 486. For example, worksite imaging sensors 274 can acquire images of the field, that are processed to identify presence of the support vehicle in the vicinity of machine 200. In another example, a communication channel (e.g., Bluetooth, etc.) can be established between the support vehicle and harvesting machine 200 to indicate presence of the support vehicle.

Alternatively, or in addition, as represented at block 487 operator 212 can provide an input that identifies that the support vehicle has rendezvoused with a harvesting machine 200. Of course, the support vehicle can be detected in other ways as well, as represented at block 488.

In an example where the support vehicle has rendezvoused with harvesting machine 200 but harvesting machine 200 is not yet ready to begin unloading, the support vehicle can be placed in a first mode that follows harvesting machine 200, as represented at block 489. For sake of illustration, but not by limitation, assume the rendezvous point has been identified at block 466 as the nearest intersection point along the machine path. Here, control system 202 can send instructions to the support vehicle to enter a "follow" mode in which the support vehicle travels behind or alongside machine 200.

At block 490, control system 202 determines that repository 219 is at or near capacity. If so, mode selector component 252 places the support vehicle in a second mode in which the support vehicle is positioned to unload repository 219, as represented at block 491. For example, as represented at block 492 the second mode can include positioning support vehicle to a side of machine 200 at a side loading spout location that unloads repository 219. Of course, the support vehicle can be positioned in other ways as well, as represented at block 493.

At block 494, repository 219 is unloaded, for example by stationary unloading (block 495) or "on the move" unloading (block 496) in which a speed of the support vehicle is matched to machine 100. At block 497, operation can be continued for any remaining unharvested areas of the field.

Figure 5:
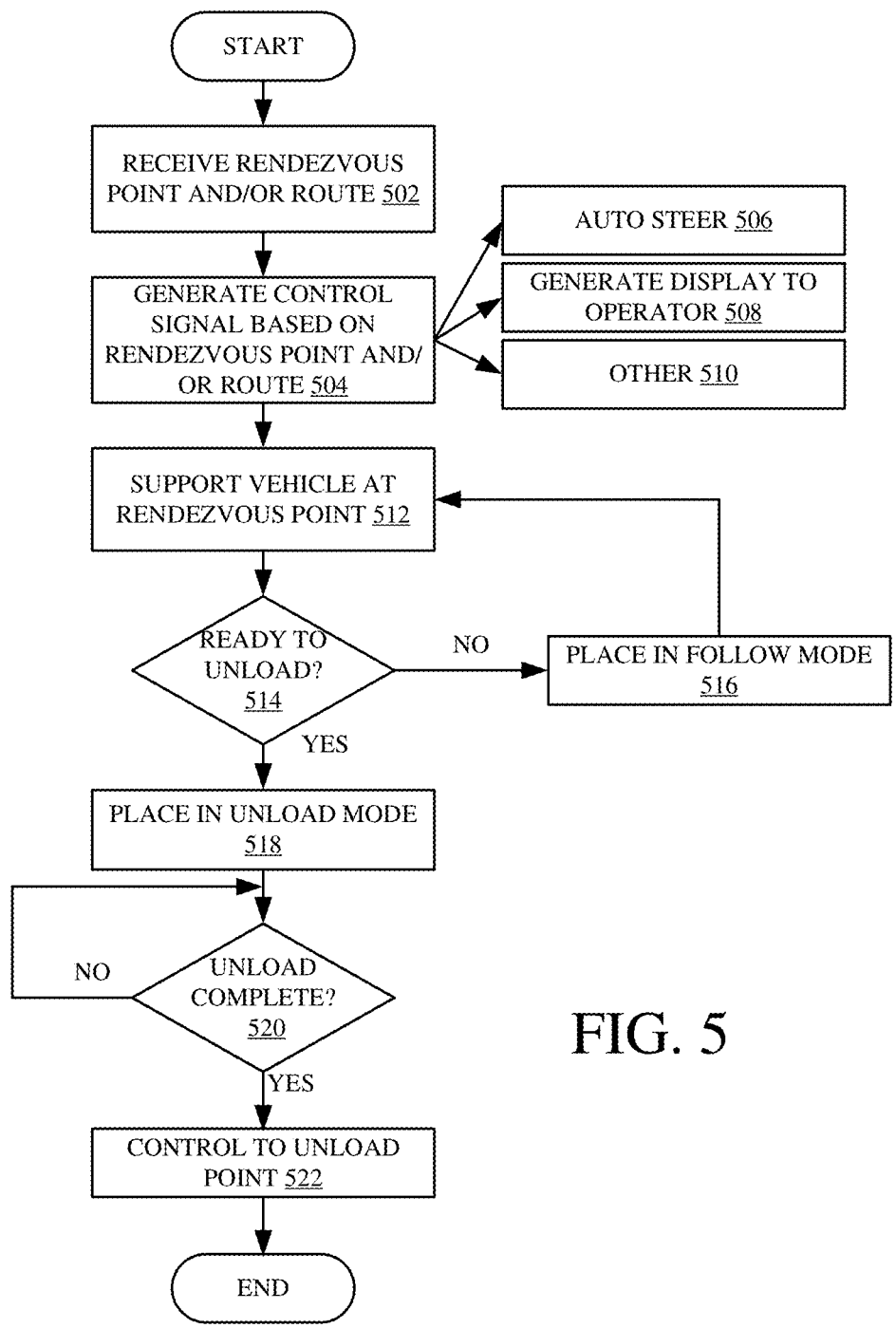
FIG. 5 is a flow diagram illustrating one example of operation of an agricultural haulage vehicle.

FIG. 5 is a flow diagram illustrating one example of operation of a support vehicle. For sake of illustration, but not by limitation, FIG. 5 will be described in the context of a haulage vehicle 292 illustrated in FIG. 2. At block 502, the haulage vehicle receives indication of the rendezvous point and/or route to the rendezvous point from control system 202 of harvesting machine 200. For example, a communication system of the support vehicle can be received directly from machine 200 or through network 298. While such a communication system is not illustrated in FIG. 2, it is noted that the support vehicle can include a communication system similar to communication subsystem 282. Also, the support vehicle can include a control system that includes components similar to one or more of the components illustrated in FIG. 2 with respect to control system 202.

At block 504, a control signal is generated based on the rendezvous point and/or route. For example, the support vehicle can be automatically controlled to traverse the route to the rendezvous point, as represented at block 506. Alternatively, or in addition, a display can be provided to an operator of the support vehicle to render an indication of the rendezvous point and/or route. In one example, block 506 can include rendering an indication of operator inputs to be provided by the operator to traverse the route to the rendezvous point. Generating a display for the operator of the support vehicle is illustrated at block 508. Of course, a control signal can be generated in other ways as well, as represented at block 510.

At block 512, support vehicle arrives at the rendezvous point. If machine 200 is not ready to begin unloading repository 219 at block 514, the support vehicle can be placed in a follow mode at block 516. In the follow mode, the support vehicle can be automatically controlled to follow harvesting machine 200 until machine 200 is ready to unload. Alternatively, or in addition, the operator can manually control the support vehicle, for example based on guidance rendered to the operator. At block 518, once machine 200 is ready to unload, the support vehicle is placed in an unload mode in which the support vehicle is positioned relative to harvesting machine 200 to receive harvested crop from repository 219. Once the unload is complete at block 220, the support vehicle can be control to an unload point at block 522. The control can include navigating the support vehicle to a secondary repository, such as a semi or other transport vehicle.

FIGS. 6A-6G illustrate examples of user interface displays that can be rendered to a user, such as, but not limited to, operator 212, user 299, or any other user. Thus, the displays can be provided to operators of machines 200 and/or 292.

Figure 6A:
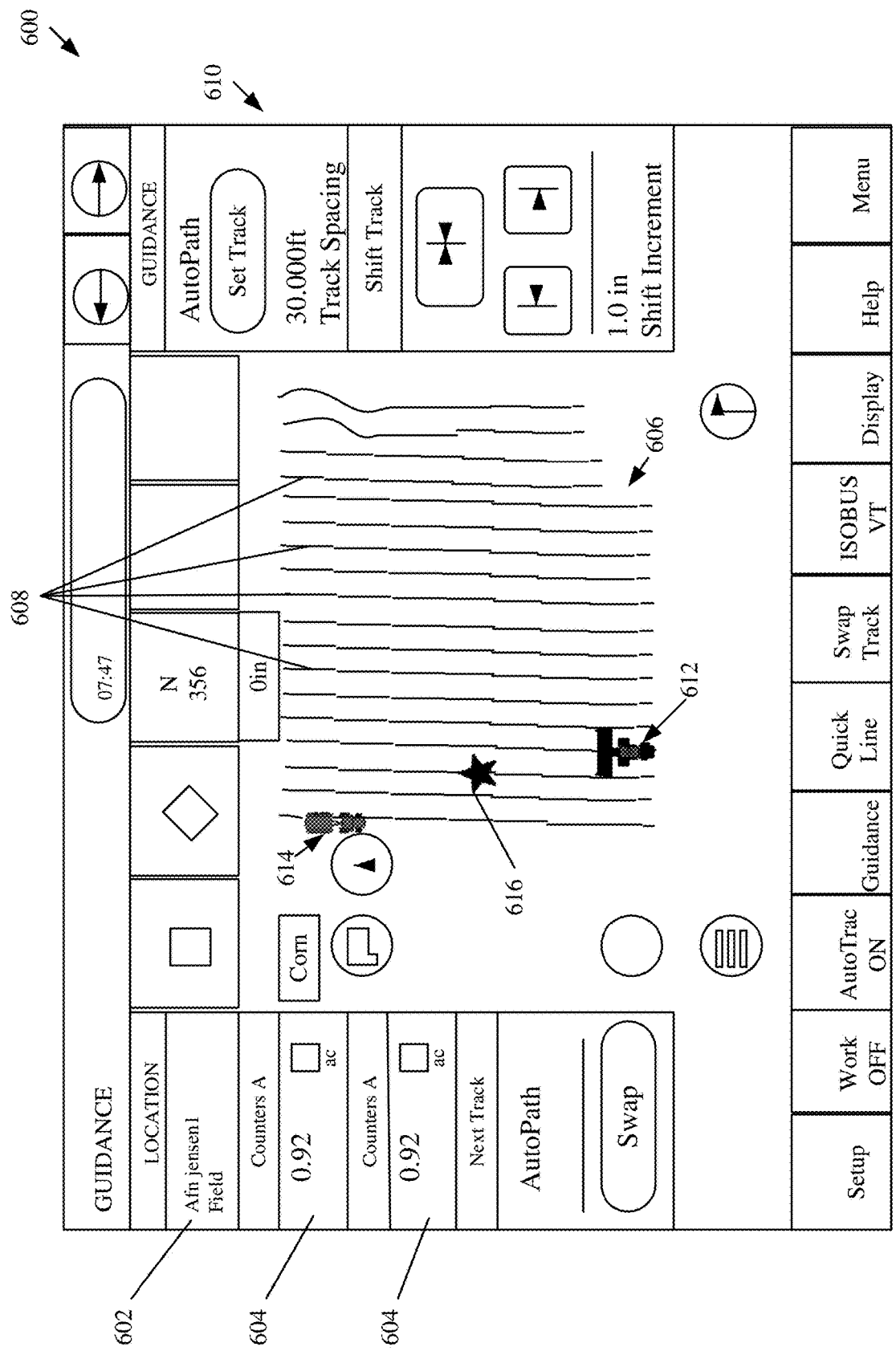
FIG. 6A-6G show examples of user interface displays.

As shown in FIG. 6A, a user interface display 600 includes a location display element 602 that identifies the field being harvested, and a yield display element 604 that identifies an amount of crop that has been harvested. Display elements 604 can identify one or more of a cumulative yield across the entire field as well as the amount of harvested crop in repository 219.

Display 600 also renders a map representation 606 that displays a portion of the field and guidance lines 608 corresponding to the machine path definition. User interface display 600 also includes guidance user input mechanisms 610 to set and/or configure the automated guidance for the harvesting machine (e.g., machine 200), represented by icon 612. Display 600 also includes an icon 614 representing a haulage vehicle (e.g., haulage vehicle 292). Display 600 includes a marker 616 that indicates a rendezvous point for the harvesting machine and the haulage vehicle.

Figure 6B:
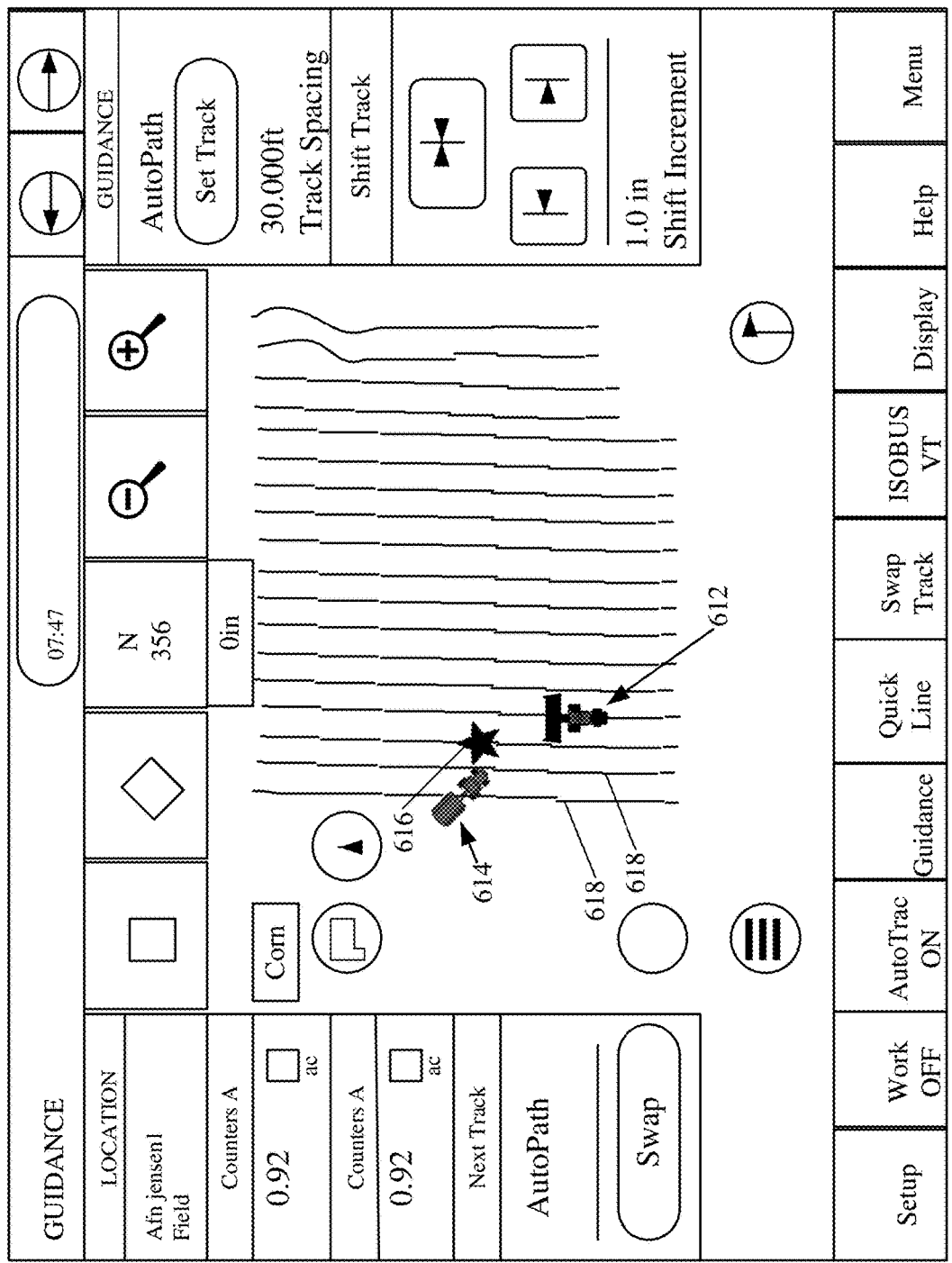
Figure 6C:
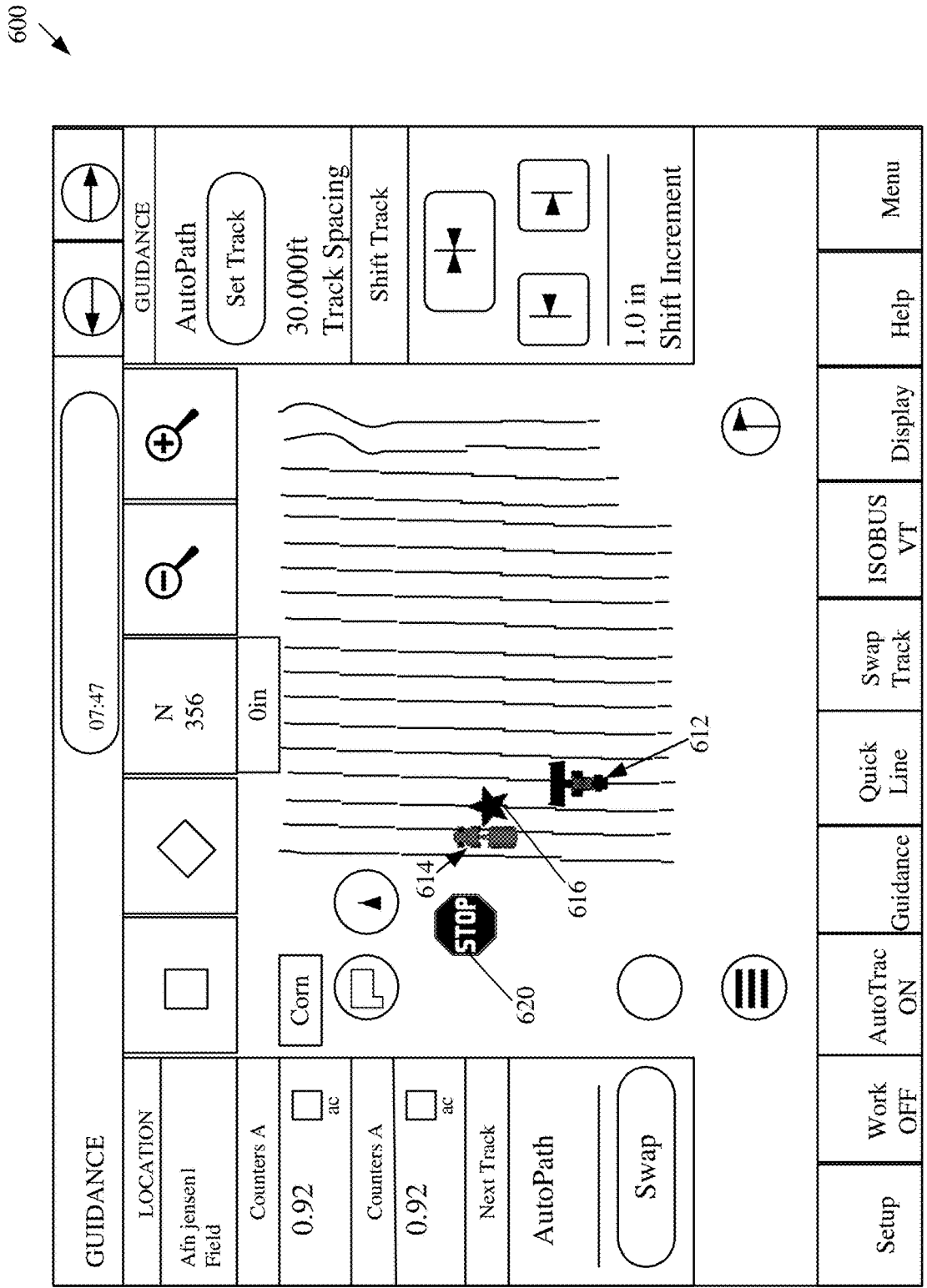

As illustrated in FIG. 6B, the haulage vehicle has been navigated (automatically or through user input) to rendezvous with the agricultural machine at the rendezvous point, indicated by marker 616. The route for the haulage vehicle traverses over already harvested passes 618 to arrive at the rendezvous point before the harvesting machine. FIG. 6C shows display 600 with the haulage vehicle at the rendezvous point. A display element 620 corresponds to the stopping position of the haulage vehicle at the rendezvous point. For instance, where display 600 is rendered to an operator of the haulage vehicle, display element 620 can be displayed to the operator (i.e., upon the haulage vehicle detecting that the rendezvous point has been reached) as an instruction for the operator to stop the haulage vehicle. Alternatively, or in addition, display element 620 can be actuatable by the operator to generate a control instruction that stops the haulage vehicle. In another example, where display 600 is rendered to an operator of the harvesting machine, display element 620 can be displayed to the operator as an indication that the haulage vehicle has stopped at the rendezvous point. Alternatively, or in addition, display element 620 can be actuatable by the operator of the harvesting machine to generate a control instruction that is sent to the haulage vehicle to stop the haulage vehicle at the rendezvous point.

Figure 6D:
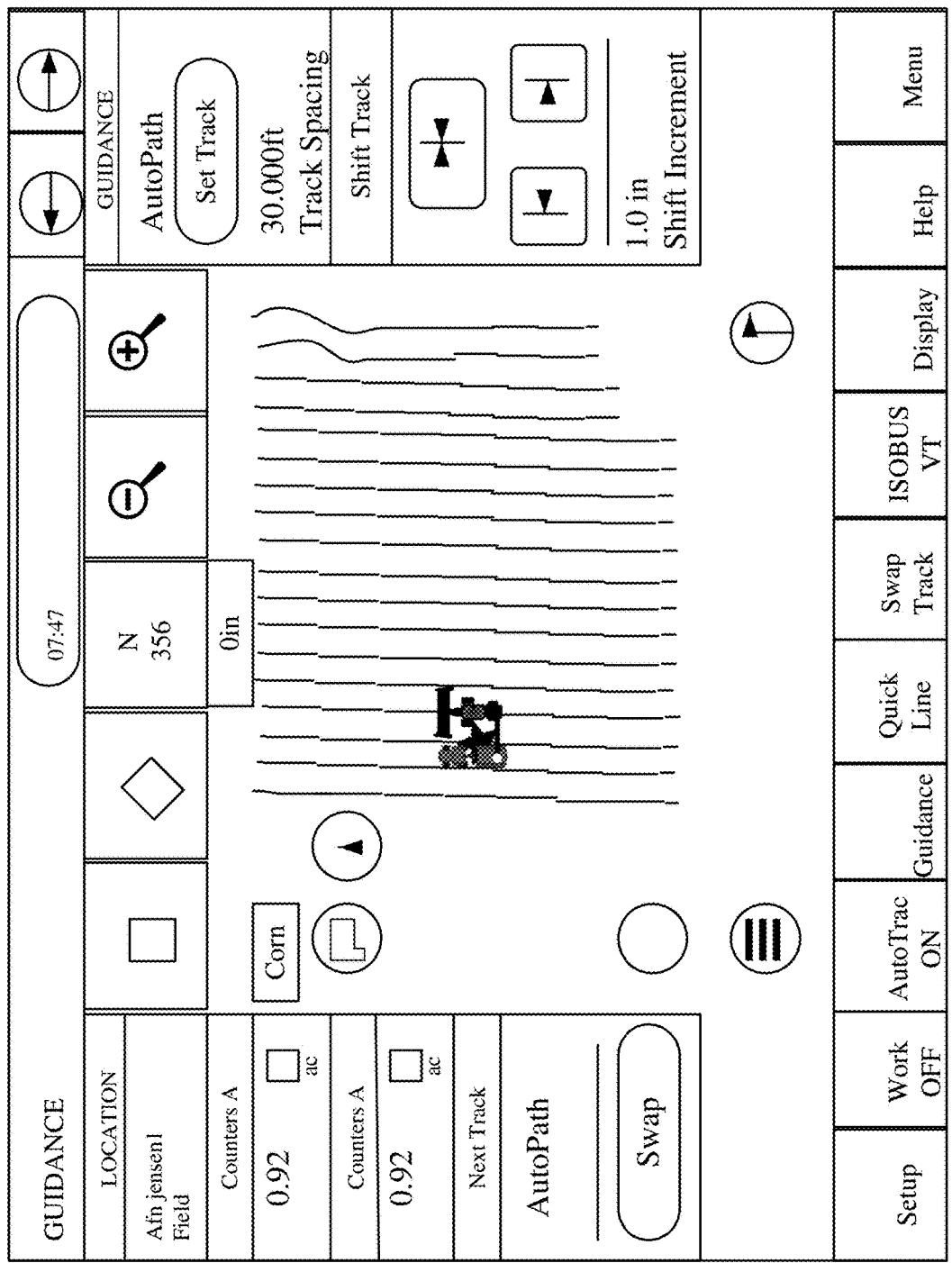

FIG. 6D shows display 600 with the haulage vehicle in an unloading position in which the repository of the agricultural machine is being unloaded into the haulage vehicle.

Figure 6E:
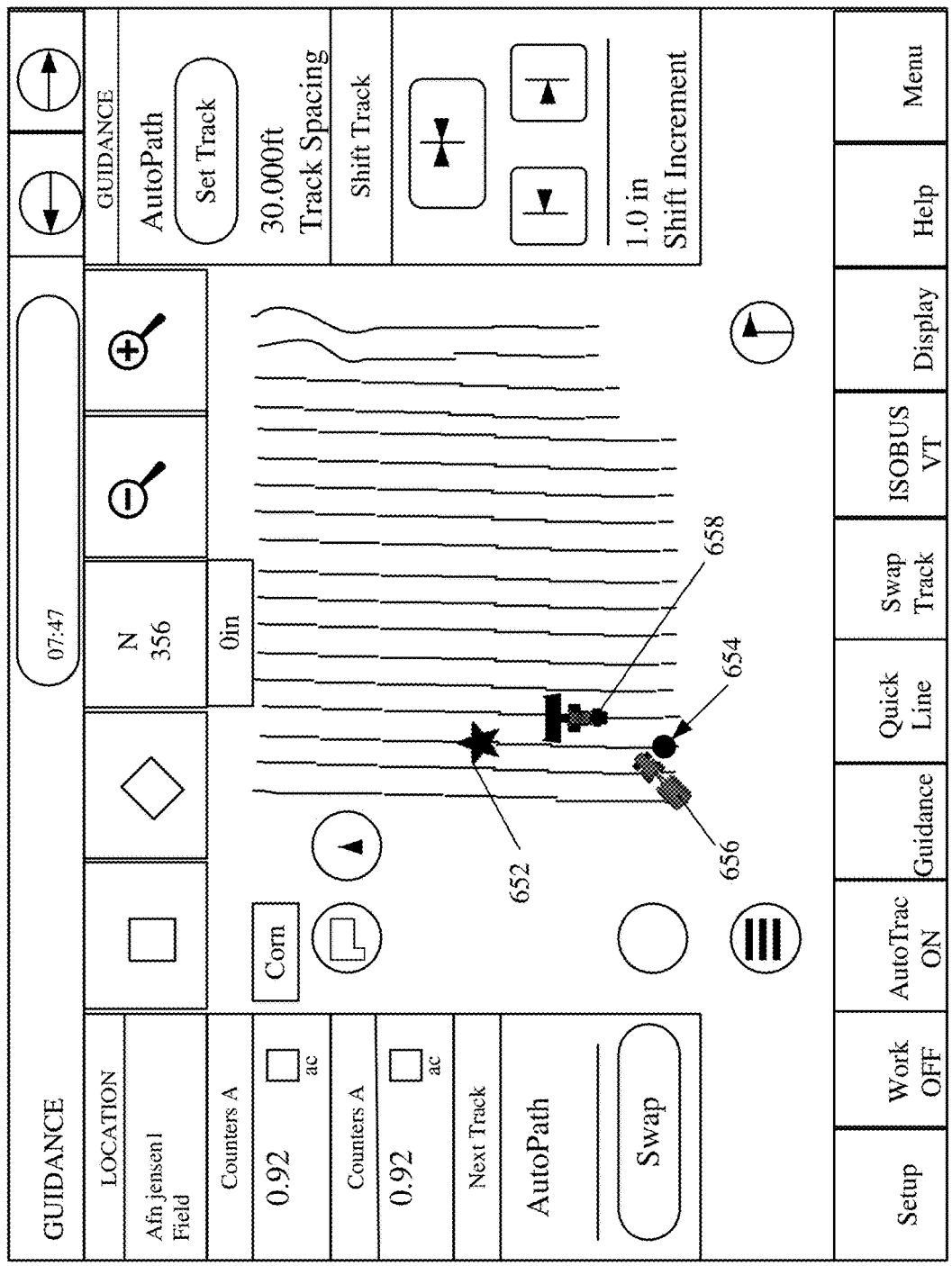

FIG. 6E illustrates a user interface display 650 in which an unloading point 652 has been identified for beginning the unloading operation. A rendezvous point 654 for haulage vehicle 656 is identified. When the haulage vehicle 656 reaches the rendezvous point with harvesting machine 658, the haulage vehicle follows the harvesting machine 658 to the unloading point 652, at which the unloading operation begins.

Figure 6F:
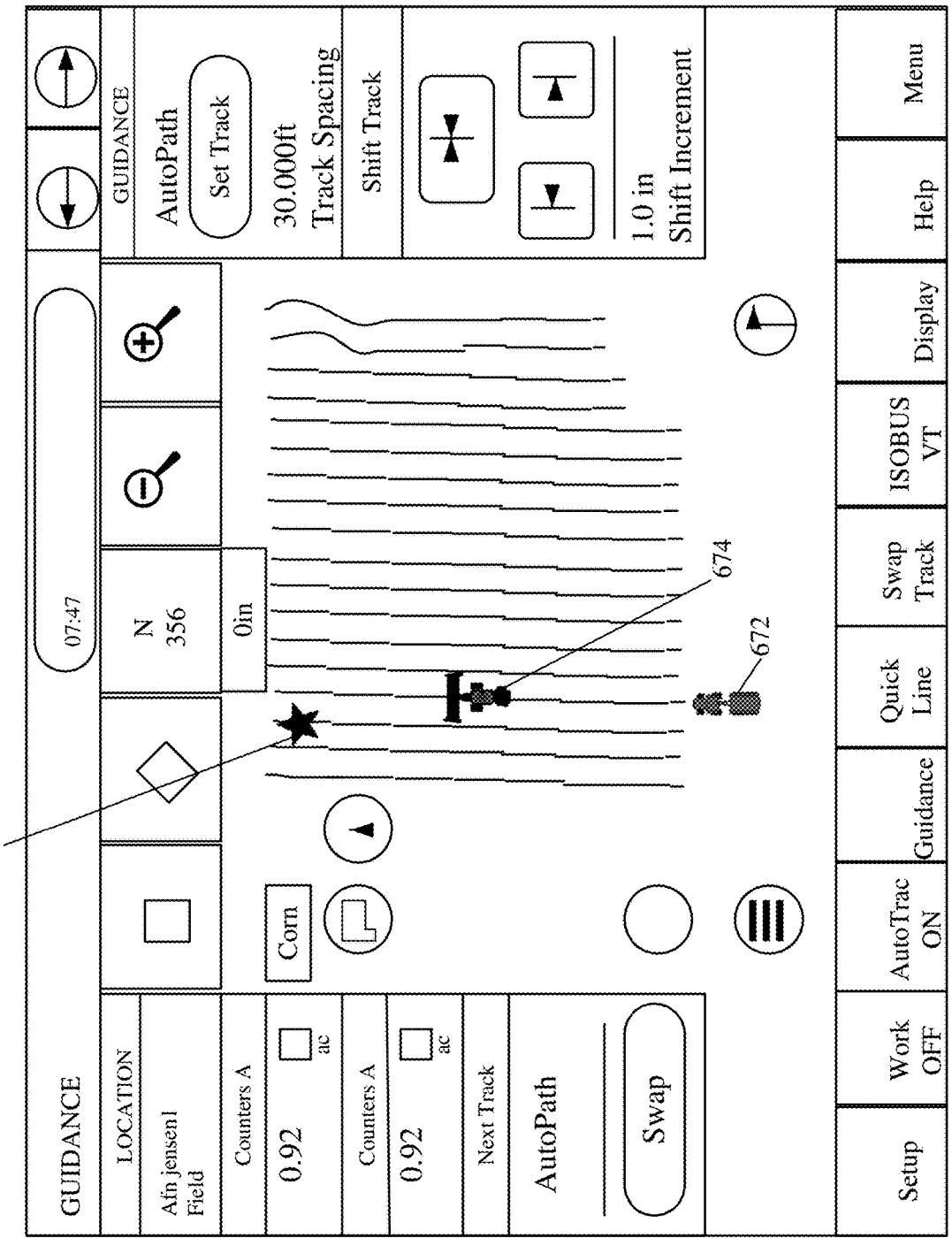
Figure 6G:
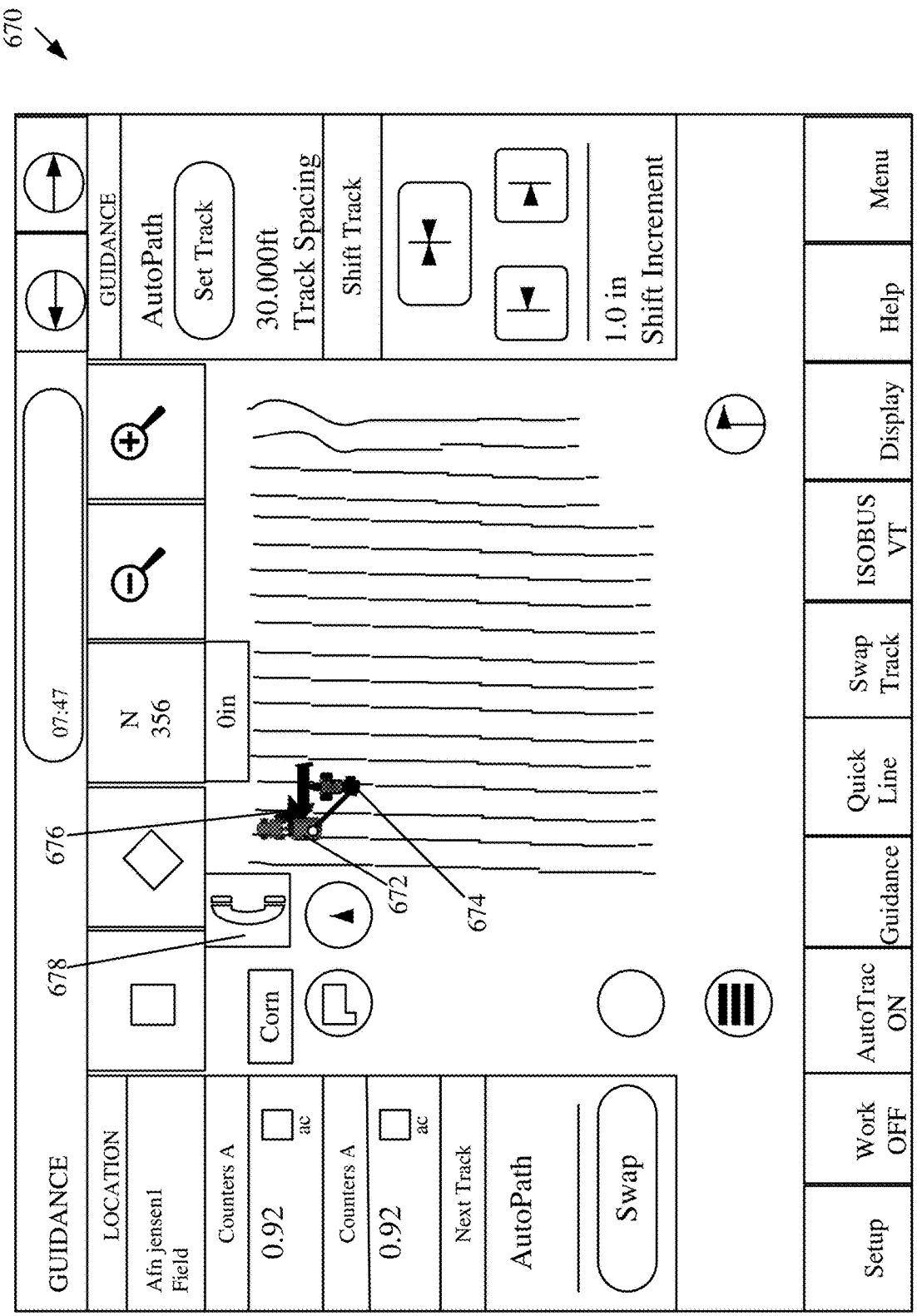

FIGS. 6F and 6G illustrate a user interface display 670, where a haulage vehicle 672 is placed in a follow mode that follows harvesting machine 674. The haulage vehicle 672 is commanded (automatically or manually) to follow the harvesting machine 674 until haulage vehicle 672 reaches the unload point 676, where the haulage vehicle 672 is commanded to enter a second mode in which haulage vehicle 672 is moved alongside the harvesting machine to receive the harvested crop from the repository.

A display element 678 can be rendered on display 670. Display element 678 is actuatable, such as by the operator of the harvesting machine, to call or command the haulage vehicle to exit the follow mode and enter the unload mode. In one example, in response to actuation of display element 678, the haulage vehicle is automatically control by the corresponding control system to travel to a position alongside the harvesting machine, as represented in FIG. 6G. Thus, the haulage vehicle, in one example, can be controlled from the operator compartment of the harvesting machine.

Figure 7:
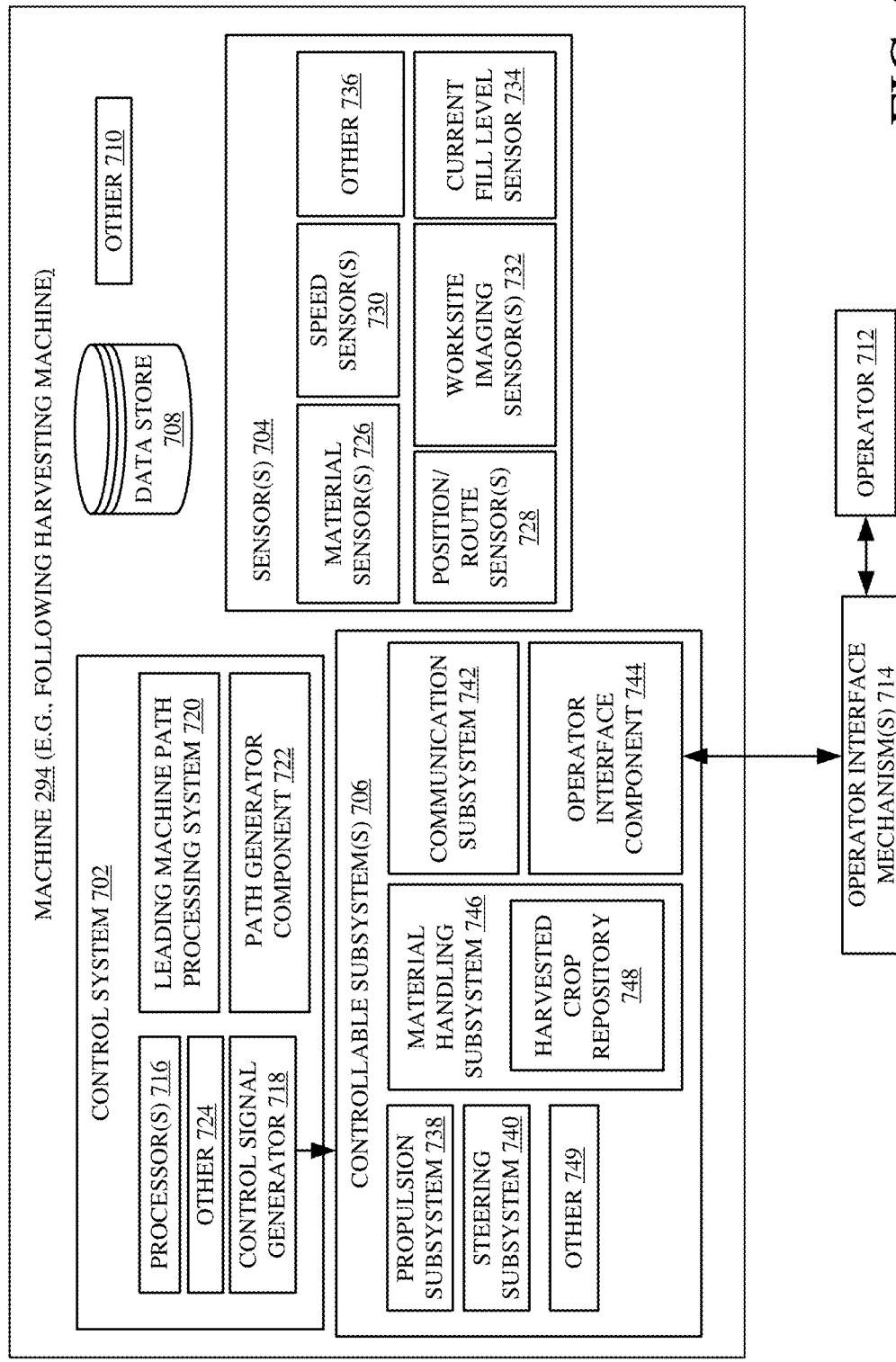
FIG. 7 is a block diagram showing one example of an agricultural machine.

As noted above with respect to FIG. 2, machine 294 can include a same type of agricultural machine as machine 200 (e.g., both machines are combines, windrows, sprayers, etc.). FIG. 7 a block diagram showing one example of machine 294. Machine 294 is configured to perform an agricultural operation in tandem with machine 200. As shown in FIG. 2, machines 200 and 294 can communicate either directly, or through network 298. Machine 294 is configured to operate in a supervised control mode in which machine 294 is controlled, either automatically or based on operator inputs, to operate in a field along with machine 200. While machines 200 and 294 can include any of a wide variety of types of agricultural machines, in the illustrated example machine 294 is a second harvesting machine that is controlled based on operation of machine 200 as a leading machine. Accordingly, machine 294 is referred to as a following harvesting machine, that follows the operation of machine 200, which is discussed in further detail below.

In the example of FIG. 7, machine 294 includes a control system 702, one or more sensors 704, controllable subsystems 706, a data store 708, and can include other items 710 as well. Control system 702 is configured to control operation of machine 294 automatically, and/or based on inputs from an operator 712 through operator interface mechanisms 714. Control system 702, in one example, includes one or more components and functionality similar to that described above with respect to control system 202. As shown in FIG. 7, control system 702 can include one or more processors 716, a control signal generator 718, a leading machine path processing system 720, a path generator component 722, and can include other items 724 as well.

Sensors 704, in one example, are similar to sensors 204 discussed above with respect to FIG. 2. Illustratively, sensors 704 include one or more material sensors 726, position/rout sensors 728, speed sensors 730, worksite imaging sensors 732, a current fill level sensor 734, and can include other sensors 736 as well.

Controllable subsystem 706, in one example, are similar to controllable subsystems 206 illustrated in FIG. 2. Illustratively, controllable subsystems 706 include a propulsion subsystem 738, a steering subsystem 740, a communication subsystem 742, an operator interface component 744, a material handling subsystem 746 (which can include a harvested crop repository 748), and can include other items 749 as well.

Leading machine path processing system 720 is configured to receive an indication of a path of the leading machine (e.g., machine 200). This leading machine path can be based on machine path definition 263. Also, system 720 can receive an indication of the current position, heading, and/or speed of machine 200 through communication subsystem 742, which communicates with communication subsystem 282 of machine 200.

Path generator component 722 is configured to generate a path for machine 294, based on the leading machine path indication from system 720.

Figure 8:
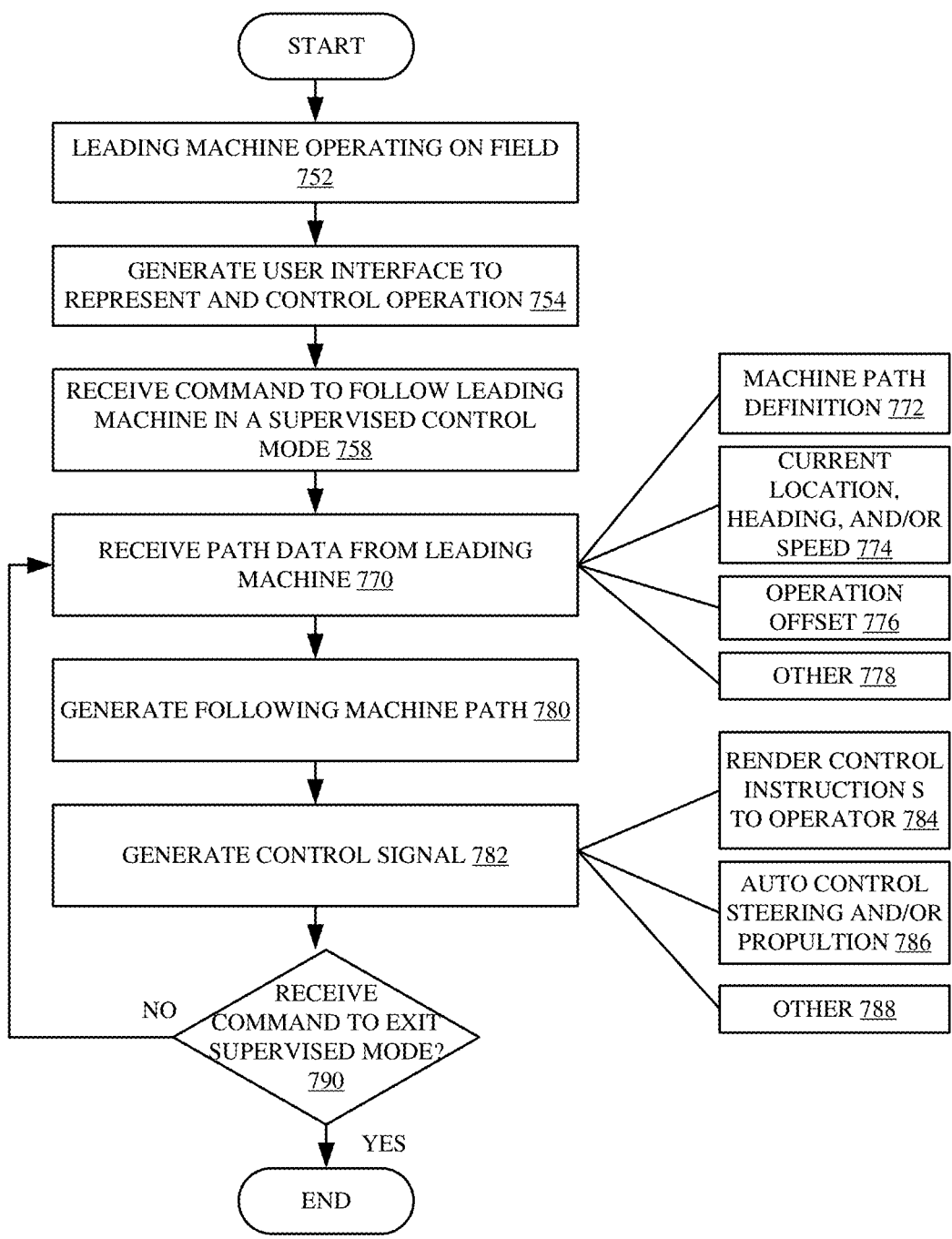
FIG. 8 is a flow diagram illustrating an example operation of a plurality of agricultural machines in a supervised mode.

FIG. 8 is a flow diagram illustrating operation of a plurality of agricultural machines in a supervised control mode. For sake of illustration, but not by limitation, FIG. 8 will be discussed in the context of first and second harvesting machines (e.g., machines 200 and 294) operating on a field.

At block 752, machine 200 (referred to as a "leading" machine) is operating on a field. Machine 200 can be controlled by an operator and/or automatically based on machine path definition 262, such as discussed above.

At block 754, a user interface is generated to represent (e.g., visualize) and control operation of machine 200 and/or the second machine 294. The second machine 294 is referred to as a "following" machine.

Figure 9:
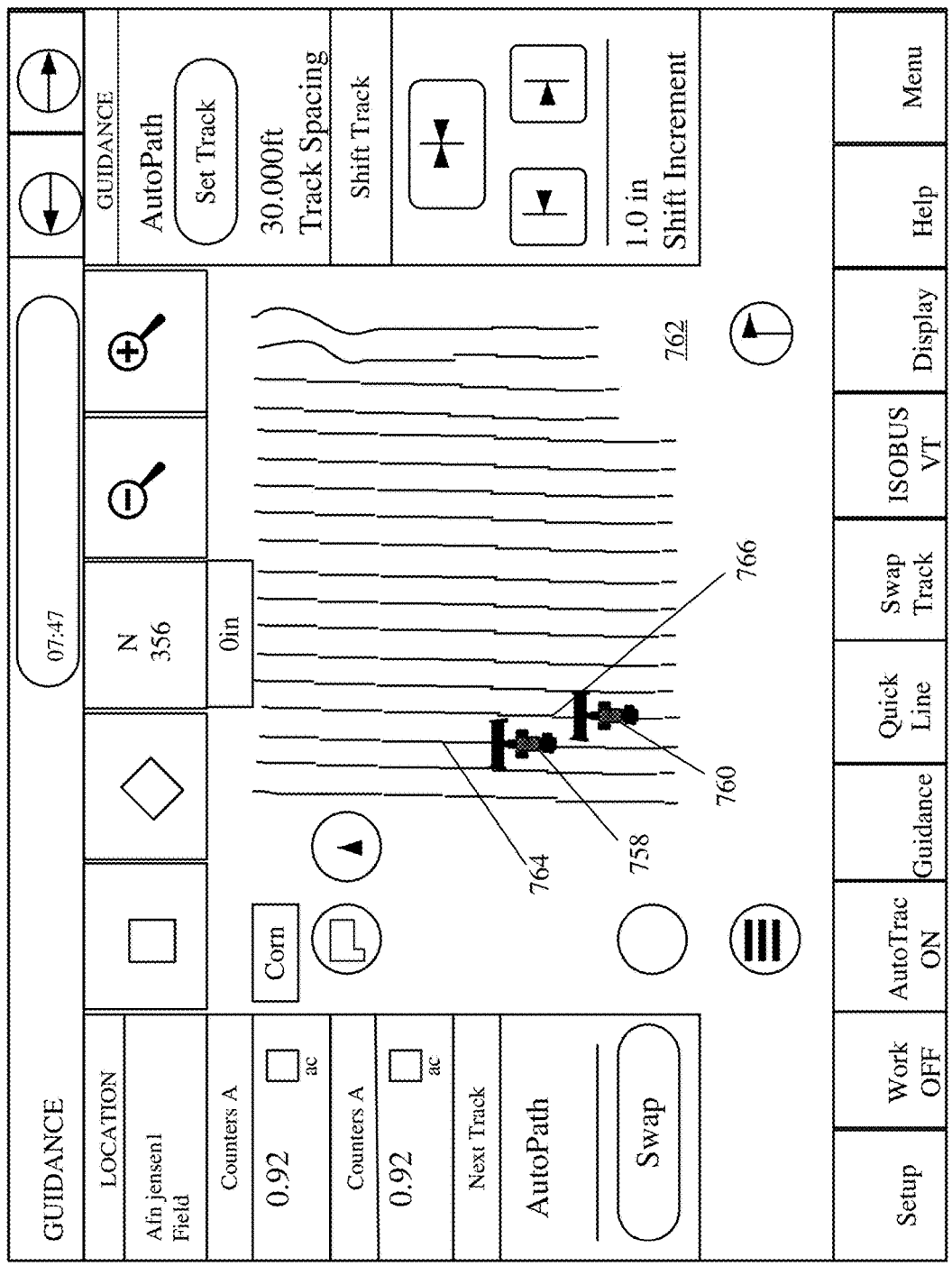
FIGS. 9 and 10 show examples of user interface displays.

FIG. 9 illustrates one example of a user interface 756 that is generated at block 754. User interface 756 can be rendered on a display device (e.g., mobile phone, monitor, display screen, etc.) associated with one or more of machines 200 and 294. For example, user interface 756 can be rendered in an operator compartment of machine 200 for interaction by operator 212. Alternatively, or in addition, user interface 756 can be rendered in an operator compartment of machine 294 to operator 712.

User interface 756 includes a display element 758 that represents machine 200 as the leading machine, and a display element 760 that represents machine 294, operating in tandem to harvest field 762. As shown, leading machine harvests a portion of field 762 in one pass 764 while the following machine operates in an another (e.g., adjacent) pass 766 to harvest another portion of field 762.

Referring again to FIG. 8, at block 768, a command is received by control system 702 of machine 294 to follow the leading machine in a supervised control mode. One example includes a supervised autonomy mode in which the following machine 294 is automatically controlled to follow the leading machine 200. In this case, an operator need not be present to control machine 294.

At block 770, system 720 receives path data from machine 200. This can include, for example, an indication of machine path definition 262, as represented at block 772. For example, control system 202 can communicate machine path definition 262, or a relevant portion thereof, to control system 702 of machine 294.

Alternatively, or in addition, a current location, heading, and/or speed of machine 200 can be received at block 774. System 720 can receive the path data from machine 200 in substantially real-time through communication subsystems 282 and 742.

In one example, the path data received at block 770 includes an operation offset 776. The operation offset represents a path offset for machine 294 relative to the current path of machine 200. In the example of FIG. 9 where machines 200 and 294 are harvesting machines, the operation offset can be based on the header widths of machines 200 and 294. The operation offset indicates the distance between the concurrent paths being taken by the machines, and is sized such that there is little to no overlap to missed crop between the respective passes of machines 200 and 294. Of course, the path data can include other data as well, as represented at block 778.

At block 780, path generator component 722 generates a machine path for the following machine 294, based on the path data received at block 770. A control signal is generated at block 782, based on the following machine path generated at block 780. For example, the control signal can render control instructions to operator 712 through operator interface mechanisms 714. This is represented at block 784. For example, the control instructions can identify control inputs for operator 712 to control machine 294 to follow machine 200 along the following machine path. More specifically, the control instructions rendered at block 784 can inform operator 712 as to the speed and steering inputs that will navigate machine 294 along the following machine path.

Also, the control signal generated at block 782 can automatically control steering subsystem 740 and/or propulsion subsystem 738 to automatically navigate machine 294 along the machine path. This is represented at block 786. Of course, other control signals can be generated to control machine 294 in other ways as well, as represented at block 788.

At block 790, it is determined whether a command is received from machine 200 to exit the supervised mode. If machine 294 remains in the supervised mode, operation returns to block 770 where any changes to the path data can be received from the leading machine 200.

Figure 10:
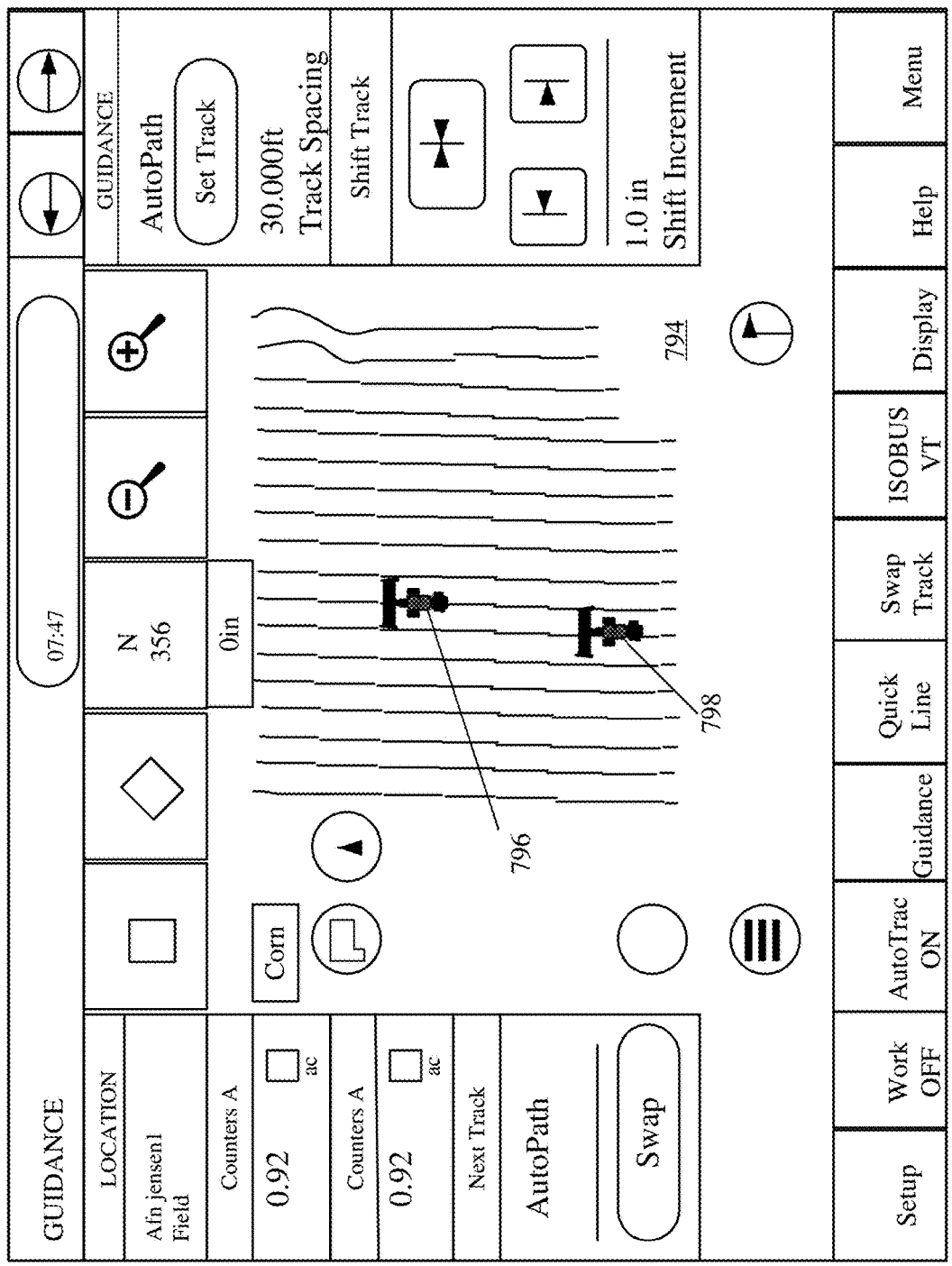

FIG. 10 illustrates a user interface 792 that represents a supervised control mode of another type of agricultural machine, namely windrowers configured to windrow crop in a field 794. User interface 792 includes a display element 796 that represents a first windrower, and a display element 798 that represents a second windrower. Of course, the features can be utilized with other types of agricultural machines as well.

While at least some of the examples above have proceeded with respect to a harvester, the described features can be used with other machines that collect or distribute material as well. Where the machine distributes material, the description is similar except that instead of generating a georeferenced probability distribution of where the material repository will be full, the georeferenced probability distribution will represent the probability distribution of where the material repository will be empty.

It can thus be seen that the present features provide a system that controls a mobile machine based on an identified haulage vehicle rendezvous point and/or route. The system improves performance of a harvesting machine architecture, for example. The present system identifies the location, and/or a route to that location, where a haulage vehicle can meet up with the agricultural harvesting machine in a manner that can reduce downtime and result in more efficient machine operation.

The present discussion has mentioned processors and servers. In one example, the processors and servers include computer processors with associated memory and timing circuitry, not separately shown. The processors and servers are functional parts of the systems or devices to which the parts belong and are activated by, and facilitate the functionality of the other components or items in those systems.

Also, a number of user interface displays have been discussed. The user interface displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The user actuatable input mechanisms can be actuated in a wide variety of different ways. For instance, user actuatable input mechanisms can be actuated using a point and click device (such as a track ball or mouse). The user actuatable input mechanisms can be actuated using hardware buttons, switches, a joystick or keyboard, thumb switches or thumb pads, etc. The user actuatable input mechanisms can also be actuated using a virtual keyboard or other virtual actuators. In addition, where the screen on which the user actuatable input mechanisms are displayed is a touch sensitive screen, the user actuatable input mechanisms can be actuated using touch gestures. Also, where the device that displays them has speech recognition components, the user actuatable input mechanisms can be actuated using speech commands.

A number of data stores have also been discussed. It will be noted the data stores can each be broken into multiple data stores. All of the data stores can be local to the systems accessing the data stores, all of the data stores can be remote, or some data stores can be local while others can be remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components, logic, and interactions. It will be appreciated that any or all of such systems, components, logic and interactions may be implemented by hardware items, such as processors, memory, or other processing components, including but not limited to artificial intelligence components, such as neural networks, some of which are described below, that perform the functions associated with those systems, components, logic, or interactions. In addition, any or all of the systems, components, logic and interactions may be implemented by software that is loaded into a memory and is subsequently executed by a processor or server or other computing component, as described below. Any or all of the systems, components, logic and interactions may also be implemented by different combinations of hardware, software, firmware, etc., some examples of which are described below. These are some examples of different structures that may be used to implement any or all of the systems, components, logic and interactions described above. Other structures may be used as well.

Figure 11:
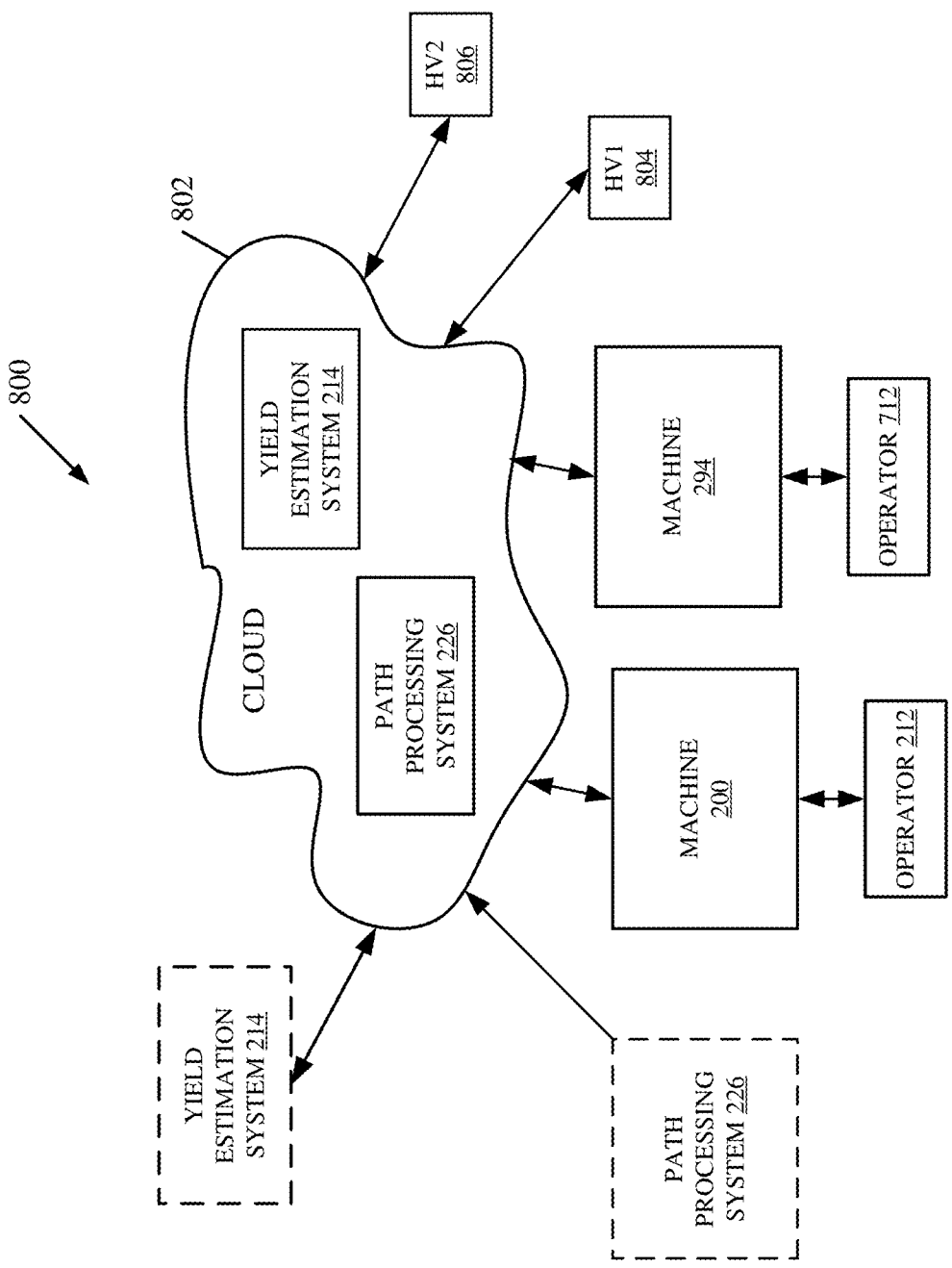
FIG. 11 is a block diagram showing one example of an agricultural harvesting machine deployed in a remote server environment.

FIG. 11 is a block diagram of machine 200, shown in FIG. 2, where machine 200 communicates with elements in a remote server architecture 800. In an example, remote server architecture 800 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and the remote servers can be accessed through a web browser or any other computing component. Software or components shown in FIG. 2 as well as the corresponding data, can be stored on servers at a remote location. The computing resources in a remote server environment can be consolidated at a remote data center location or the computing resources can be dispersed. Remote server infrastructures can deliver services through shared data centers, even though the infrastructures appear as a single point of access for the user. Thus, the components and functions described herein can be provided from a remote server at a remote location using a remote server architecture. Alternatively, the components and functions can be provided from a conventional server, or the components and functions can be installed on client devices directly, or in other ways.

In the example shown in FIG. 11, some items are similar to those shown in FIG. 2 and the items are similarly numbered. FIG. 11 specifically shows that path processing system 226, and yield estimation system 214 can be located at a remote server location 802. Therefore, machine 200 accesses those systems through remote server location 802. Further, one or more haulage vehicles 804, 806 can access machine 200 and/or the corresponding systems through remote server location 802.

FIG. 11 also depicts another example of a remote server architecture. FIG. 11 shows that it is also contemplated that some elements of FIG. 2 are disposed at remote server location 802 while others are not. By way of example, path processing system 226, yield estimation system 214, and/or other systems or logic can be disposed at a location separate from location 802, and accessed through the remote server at location 802. Regardless of where they are located, they can be accessed directly by machine 200, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As machine 200 comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on machine 200 until the machine 200 enters a covered location. The machine 200, itself, can then send the information to the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 12:
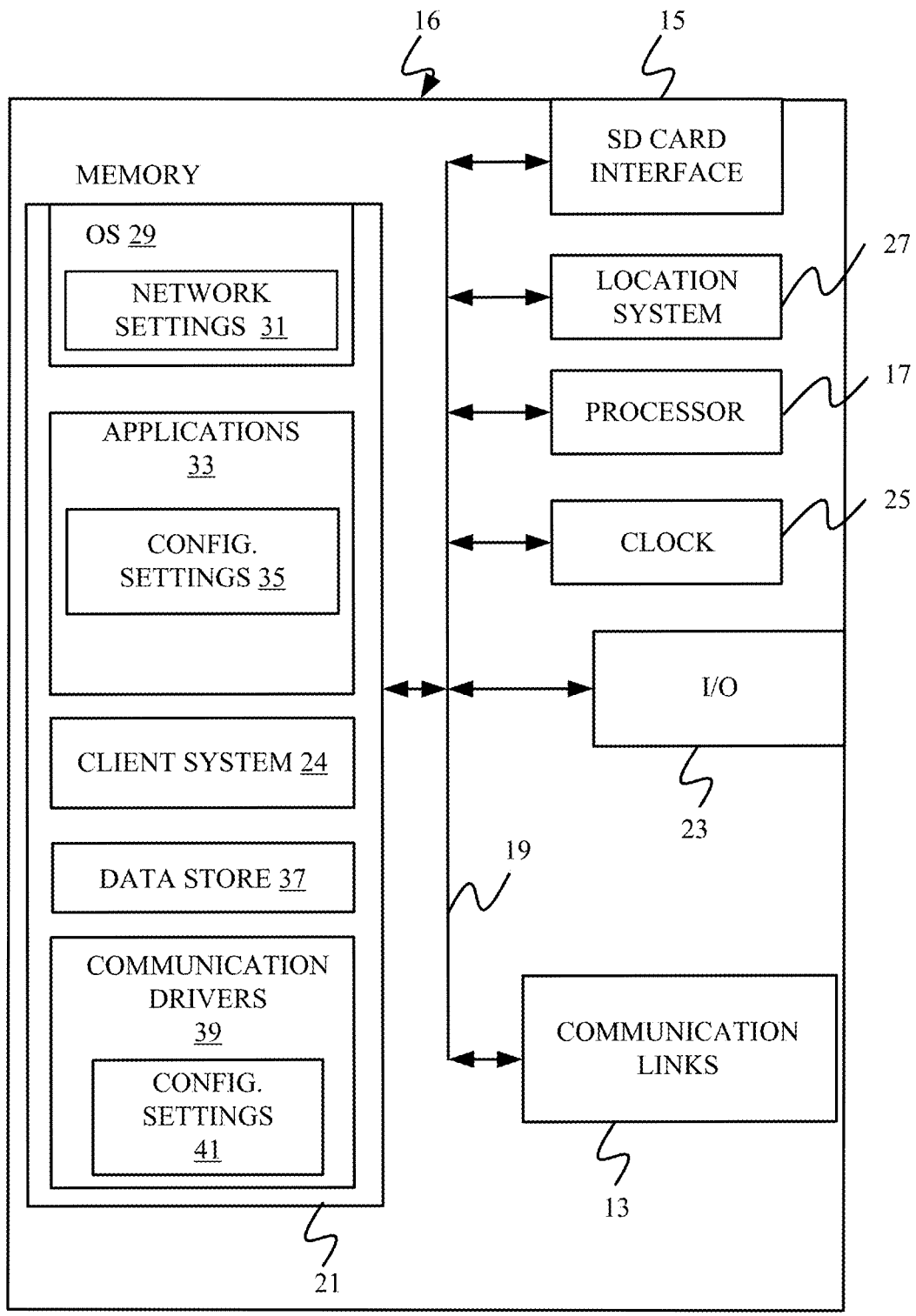
FIGS. 12-14 show examples of mobile devices that can be used in the architectures shown in the previous figures.
Figure 13:
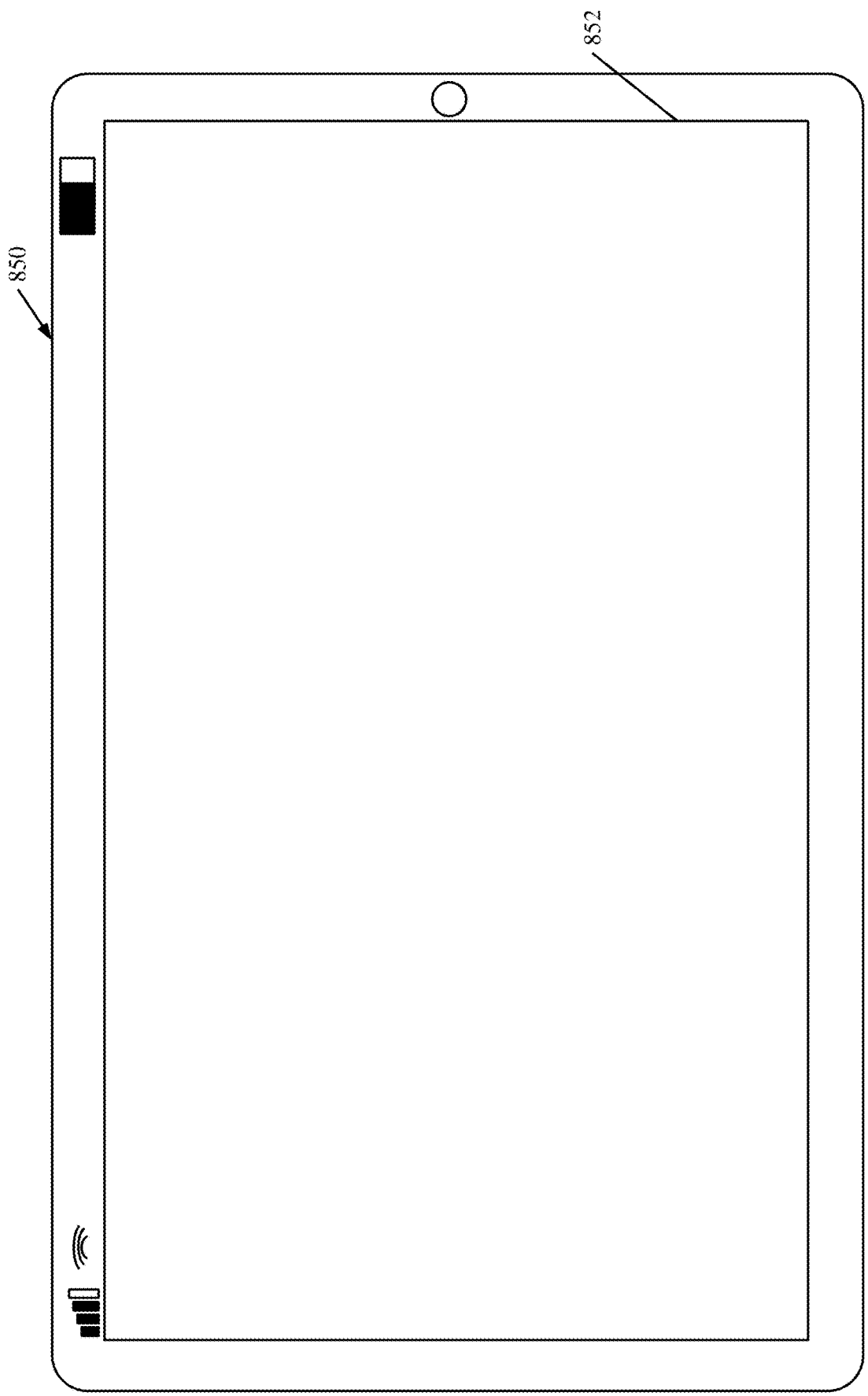
Figure 14:
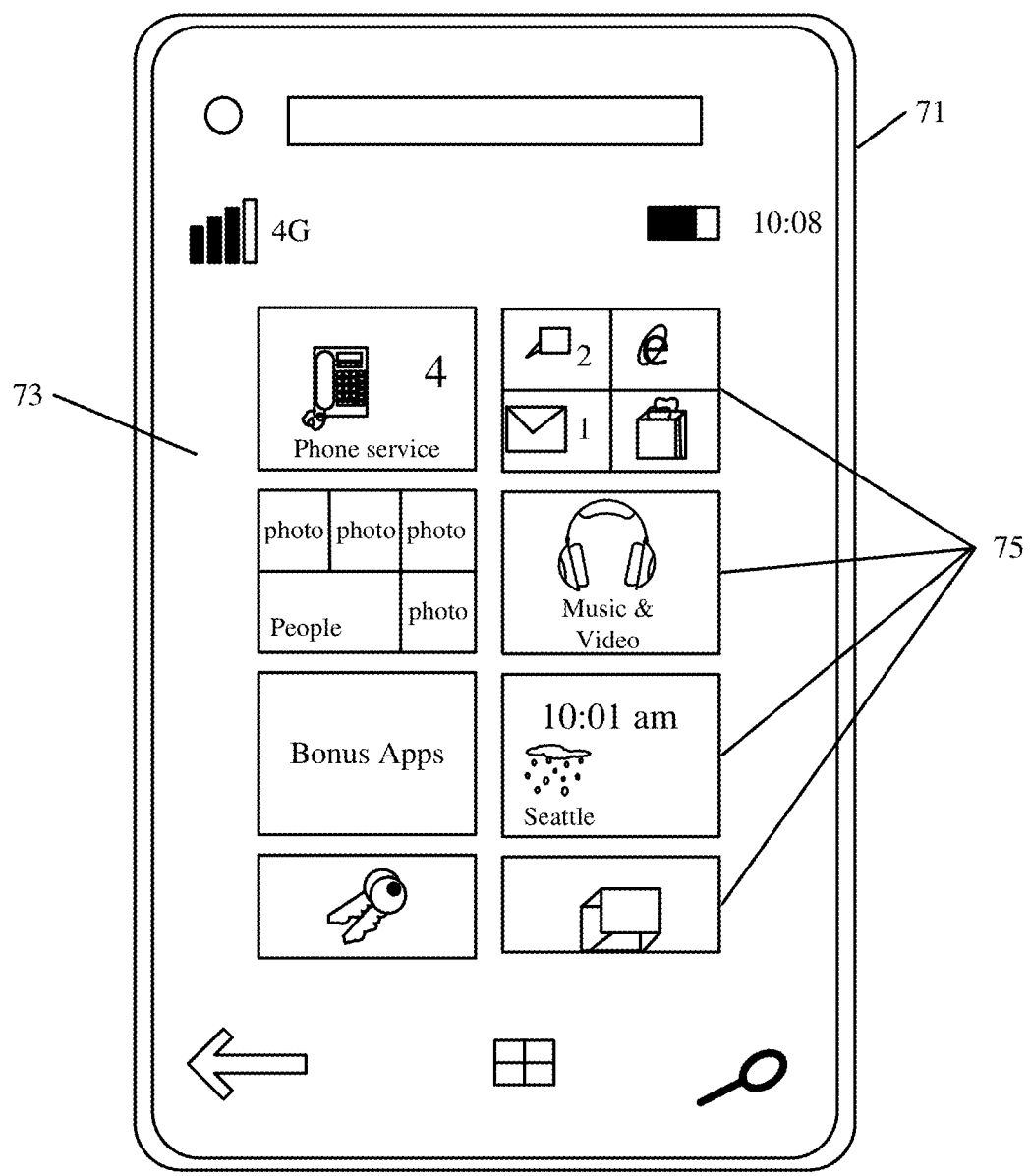

FIG. 12 is a simplified block diagram of one example of a handheld or mobile computing device that can be used as a user's or client's handheld device 16, in which the present system (or parts of it) can be deployed. For instance, a mobile device can be deployed in the operator compartment of machine 200 and/or machine 294 for use in generating, processing, or displaying the yield estimation data, path processing data, and/or obstacle avoidance data. FIGS. 13-14 are examples of handheld or mobile devices.

FIG. 12 provides a general block diagram of the components of a client device 16 that can run some components shown in FIG. 2, that interacts with them, or both. In the device 16, a communications link 13 is provided that allows the handheld device to communicate with other computing devices and under some examples provides a channel for receiving information automatically, such as by scanning.

Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. Clock 25 can also, illustratively, provide timing functions for processor 17.

Location system 27 illustratively includes a component that outputs a current geographical location of device 16. Location system 27 can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 13 shows one example in which device 16 is a tablet computer 850. In FIG. 13, computer 850 is shown with user interface display screen 852. Screen 852 can be a touch screen or a pen-enabled interface that receives inputs from a pen or stylus. Computer 850 can also use an on-screen virtual keyboard. Of course, computer 850 might also be attached to a keyboard or other user input device through a suitable attachment mechanism, such as a wireless link or USB port, for instance. Computer 850 can also illustratively receive voice inputs as well.

FIG. 14 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 15:
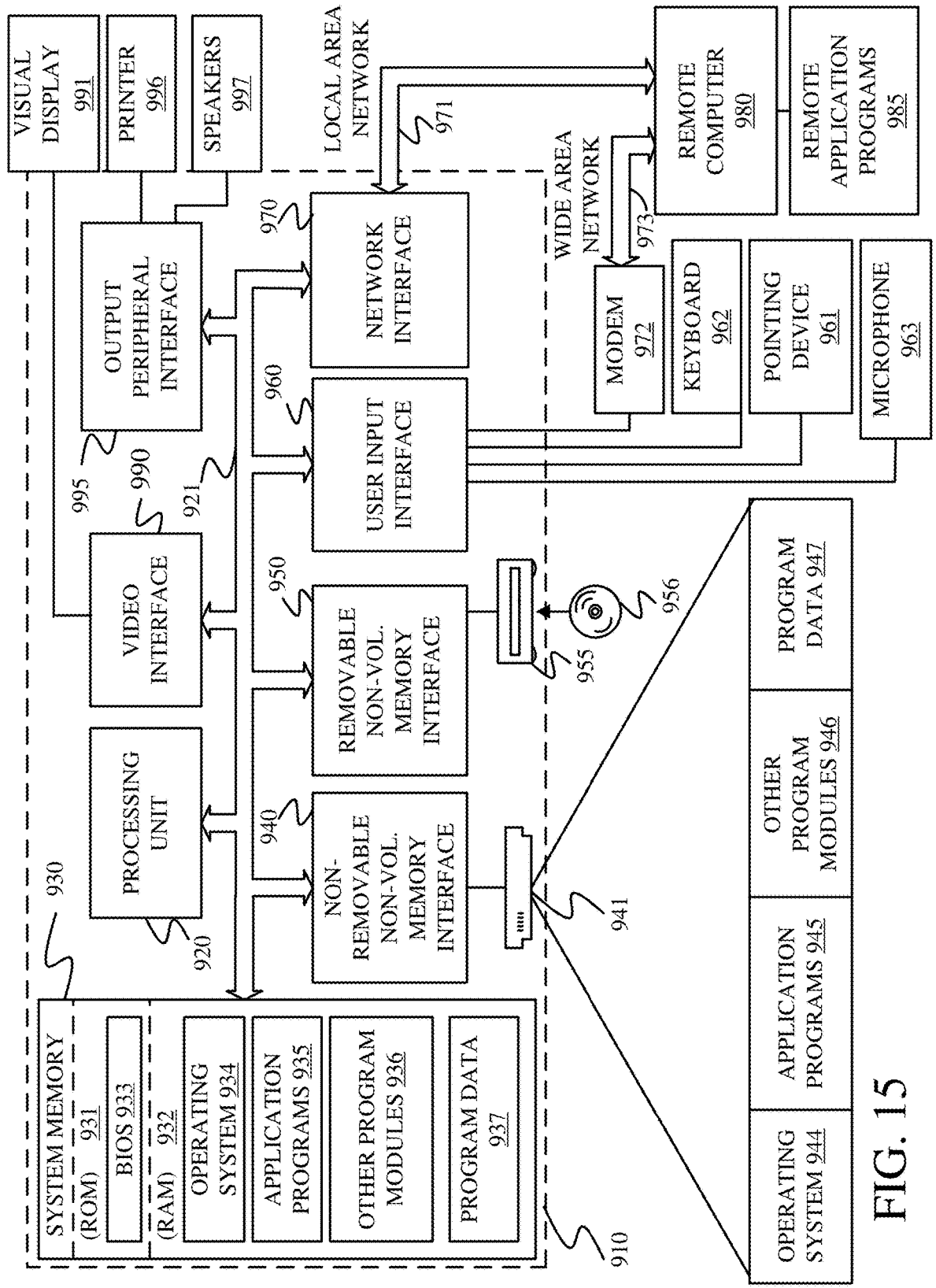
FIG. 15 is a block diagram showing one example of a computing environment that can be used in the architectures shown in the previous figures.

FIG. 15 is one example of a computing environment in which elements of FIG. 2, or parts of it, (for example) can be deployed. With reference to FIG. 15, an example system for implementing some examples includes a general-purpose computing device in the form of a computer 910. Components of computer 910 may include, but are not limited to, a processing unit 920 (which can comprise processors from pervious FIGS.), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. Memory and programs described with respect to FIG. 2 can be deployed in corresponding portions of FIG. 15.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 15 illustrates operating system 934, application programs 935, other program modules 936, and program data 937.

The computer 910 may also include other removable/non-removable volatile/nonvolatile computer storage media. By way of example only, FIG. 15 illustrates a hard disk drive 941 that reads from or writes to non-removable, nonvolatile magnetic media, an optical disk drive 955, and nonvolatile optical disk 956. The hard disk drive 941 is typically connected to the system bus 921 through a non-removable memory interface such as interface 940, and optical disk drive 955 are typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 15, provide storage of computer readable instructions, data structures, program modules and other data for the computer 910. In FIG. 15, for example, hard disk drive 941 is illustrated as storing operating system 944, application programs 945, other program modules 946, and program data 947. Note that these components can either be the same as or different from operating system 934, application programs 935, other program modules 936, and program data 937.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures. A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections (such as a local area network—LAN, or wide area network WAN) to one or more remote computers, such as a remote computer 980.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. In a networked environment, program modules may be stored in a remote memory storage device. FIG. 15 illustrates, for example, that remote application programs 985 can reside on remote computer 980.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural harvesting machine comprising:
    a harvested crop repository having a fill capacity;
    a crop processing system configured to engage crop in a field, perform a crop processing operation on the crop to obtain processed crop, and move the processed crop to the harvested crop repository;
    a fill level sensor configured to generate a fill level signal indicative of a current till level of the harvested crop repository; and
    a control system configured to:
        obtain a machine path definition that represents a machine path for the agricultural harvesting machine to perform harvesting passes over a land portion in the field, wherein the machine path definition defines;
            a turn pattern for the harvesting passes, and
            a land size representing a number of the harvesting passes to be made with the turn pattern;
        identify a rendezvous point in the field for the agricultural harvesting machine and a haulage vehicle based on the turn pattern and the land size; and
        generate a control signal based on the rendezvous point.

2. The agricultural harvesting machine of claim 1, and further comprising a communication system, wherein the control system is configured to control the communication system to communicate an indication of the rendezvous point to the haulage vehicle.

3. The agricultural harvesting machine of claim 2, wherein the control system is configured to:
    identify a location of the haulage vehicle;
    generate a route for the haulage vehicle to the rendezvous point based on the location of the haulage vehicle; and
    control the communication system to communicate an indication of the route to the haulage vehicle.

4. The agricultural harvesting machine of claim 3, wherein the control system is configured to:
    identify harvested areas of the field based on the machine path definition; and
    generate the route for the haulage vehicle to the rendezvous point based on the harvested areas of the field.

5. The agricultural harvesting machine of claim 3, wherein the control system is configured to:
    identify one or more obstacles in the field; and
    identify the route for the haulage vehicle to the rendezvous point based on the one or more obstacles.

6. The agricultural harvesting machine of claim 1, wherein
    the machine path definition comprises a turn direction, and
    the control system is configured to identify the rendezvous pint based on whether the turn pattern comprises a spiral-in pattern or a spiral-out.

7. The agricultural harvesting machine of claim 1, wherein the control system is configured to identify the rendezvous point based on the fill level signal.

8. The agricultural harvesting machine of claim 7, wherein the control system is configured to:
    obtain a predicted crop yield along the machine path; and
    identify the rendezvous point based on the predicted crop yield.

9. The agricultural harvesting machine of claim 8, wherein the control system is configured to:
    obtain a predicted crop yield at a plurality of different field segments along the machine path;
    generate a georeferenced probability distribution indicative of a probability that the harvested crop repository will reach the till capacity in the different field segments along the machine path; and
    identify the rendezvous point based on the georeferenced probability distribution.

10. The agricultural harvesting machine of claim 1, wherein the control system is configured to:
    send a mode transition control signal to the haulage vehicle to transition the haulage vehicle from a first mode, in which the haulage vehicle is in a following position that follows the agricultural harvesting machine, to a second mode in which the haulage vehicle is in an unloading position configured to receive harvested crop from the agricultural harvesting machine.

11. A method performed by an agricultural harvesting machine, the method comprising:
obtaining a machine path definition that represents a machine path for the agricultural harvesting machine to perform harvesting passes over a land portion in a field, wherein the machine path definition defines;
a turn pattern for the harvesting passes, and
a land size representing a number of the harvesting passes to be made with the turn pattern;
controlling a crop processing system to engage crop in the field, perform a crop processing operation on the crop to obtain processed crop, and move the processed crop to a harvested crop repository having a fill capacity;
identifying a rendezvous point in the field for the agricultural harvesting machine and a haulage vehicle based on the turn pattern and the land size; and
generating a control signal based on the rendezvous point.

12. The method of claim 11, wherein the control signal controls a communication system to communicate an indication of the rendezvous point to the haulage vehicle.

13. The method of claim 12, and further comprising:
identifying a location of the haulage vehicle;
generating a route for the haulage vehicle to the rendezvous point based on the location of the haulage vehicle; and
controlling the communication system to communicate an indication of the route to the haulage vehicle.

14. The method of claim 11, wherein
the machine path definition comprises a turn direction, and
the turn pattern comprises one of spiral-in or spiral-out.

15. The method of claim 11, and further comprising:
obtaining a predicted crop yield at a plurality of different field segments along the machine path;
generating a georeferenced probability distribution indicative of a probability that the harvested crop repository will reach the fill capacity in the plurality of different field segments along the machine path; and
identifying the rendezvous point based on the georeferenced probability distribution.

16. The method of claim 11, and further comprising:
sending a mode transition control signal to the haulage vehicle to transition the haulage vehicle from a first mode, in which the haulage vehicle is in a following position that follows the agricultural harvesting machine, to a second mode in which the haulage vehicle is in an unloading position configured to receive harvested crop from the agricultural harvesting machine.

17. A control system for an agricultural harvesting machine, the control system comprising:
at least one processor, and
memory storing instructions executable by the at least one processor, wherein the instructions, when executed, cause the control system to:
obtain a machine path definition that represents a machine path for the agricultural harvesting machine to perform harvesting passes over a land portion in a field, wherein the machine path definition defines:
a turn pattern for the harvesting passes, and
a land size of representing a number of the harvesting passes to be made with the turn pattern;
control a crop processing system to engage crop in the field, perform a crop processing operation on the crop to obtain processed crop, and move the processed crop to a harvested crop repository having a fill capacity;
identify a rendezvous point in the field for the agricultural harvesting machine and a haulage vehicle based on the turn pam and the land size; and
generate a control signal based on the rendezvous point.

18. The control system of claim 17, wherein the instructions, when executed, cause the control system to communicate an indication of the rendezvous point to the haulage vehicle.

19. The control system of claim 17, wherein the instructions, when executed, cause the control system to:
obtain a predicted crop yield at a plurality of different field segments along the machine path;
generate a georeferenced probability distribution indicative of a probability that the harvested crop repository will reach the till capacity in the different field segments along the machine path; and
identify the rendezvous point based on the georeferenced probability distribution.

* * * * *